(12) United States Patent
Lee et al.

(10) Patent No.: US 8,151,292 B2
(45) Date of Patent: *Apr. 3, 2012

(54) SYSTEM FOR REMOTE ACCESS TO MEDIA, AND REACTION AND SURVEY DATA FROM VIEWERS OF THE MEDIA

(75) Inventors: Hans C. Lee, Carmel, CA (US); Timmie T. Hong, San Diego, CA (US); Michael J. Lee, Carmel, CA (US)

(73) Assignee: Emsense Corporation, San Francisco, CA (US)

( * ) Notice: Subject to any disclaimer, the term of this patent is extended or adjusted under 35 U.S.C. 154(b) by 472 days.

This patent is subject to a terminal disclaimer.

(21) Appl. No.: 12/244,748

(22) Filed: Oct. 2, 2008

(65) Prior Publication Data

US 2009/0094286 A1     Apr. 9, 2009

Related U.S. Application Data

(60) Provisional application No. 60/977,035, filed on Oct. 2, 2007, provisional application No. 60/977,040, filed on Oct. 2, 2007, provisional application No. 60/977,042, filed on Oct. 2, 2007, provisional application No. 60/977,045, filed on Oct. 2, 2007, provisional application No. 60/984,260, filed on Oct. 31, 2007, provisional application No. 60/984,268, filed on Oct. 31, 2007, provisional application No. 60/991,591, filed on Nov. 30, 2007.

(51) Int. Cl.
*H04H 60/56* (2008.01)

(52) U.S. Cl. ............... 725/12; 725/9; 725/37; 707/608; 707/610; 707/736; 707/758; 707/781

(58) Field of Classification Search .................. None
See application file for complete search history.

(56) References Cited

U.S. PATENT DOCUMENTS

| 4,695,879 A | 9/1987 | Weinblatt |
| 4,755,045 A | 7/1988 | Borah et al. |

(Continued)

FOREIGN PATENT DOCUMENTS

KR    10-2000-0072489    12/2000

(Continued)

OTHER PUBLICATIONS

Form PCT/ISA/220, PCT/US07/15019, "PCT Notification of Transmittal of The International Search Report and the Written Opinion of the International Searching Authority, or the Declaration," 1 pg.
Form PCT/ISA/210, PCT/US07/15019, "PCT International Search Report," 2 pgs.
Form PCT/ISA/237, PCT/US07/15019, "PCT Written Opinion of the International Searching Authority," 5 pgs.
Form PCT/IB/326, PCT/US07/015019, "Notification Concerning Transmittal of International Preliminary Report on Patentability."
Form PCT/IB/373, PCT/US07/15019, "International Preliminary Report on Patentability."

(Continued)

*Primary Examiner* — Hung Le
(74) *Attorney, Agent, or Firm* — Gregory & Sawrie LLP

(57) ABSTRACT

Embodiments are described that enable remote and interactive access, navigation, and analysis of reactions from viewers to a media instance. The reactions include physiological responses, survey results, verbatim feedback, event-based metadata, and derived statistics for indicators of success and failure from the viewers. The reactions are aggregated, and an interface enables remote access and navigation of the media instance, aggregated physiological responses synchronized with the media instance, survey results, and/or verbatim feedback related to the media instance. This enables users to interactively divide, dissect, parse, and analyze the reactions as they prefer. This automation provides an automated process enabling non-experts to understand complex physiological data, and to organize presentation of complex data according to their needs so as to present conclusions as appropriate to the media instance.

47 Claims, 16 Drawing Sheets

U.S. PATENT DOCUMENTS

| | | |
|---|---|---|
| 4,846,190 A | 7/1989 | John |
| 4,931,934 A | 6/1990 | Snyder |
| 4,974,602 A | 12/1990 | Abraham-Fuchs et al. |
| 5,243,517 A * | 9/1993 | Schmidt et al. ............... 600/544 |
| 5,406,957 A | 4/1995 | Tansey |
| 5,447,166 A | 9/1995 | Gevins |
| 5,450,855 A | 9/1995 | Rosenfeld |
| 5,537,618 A * | 7/1996 | Boulton et al. ............... 715/745 |
| 5,579,774 A | 12/1996 | Miller et al. |
| 5,601,090 A | 2/1997 | Musha |
| 5,676,138 A * | 10/1997 | Zawilinski ..................... 600/301 |
| 5,692,906 A | 12/1997 | Corder |
| 5,724,987 A | 3/1998 | Givins et al. |
| 5,740,812 A | 4/1998 | Cowan |
| 5,774,591 A | 6/1998 | Black et al. |
| 5,983,129 A | 11/1999 | Cowan et al. |
| 5,983,214 A | 11/1999 | Lang et al. |
| 6,099,319 A | 8/2000 | Zaltman et al. |
| 6,254,536 B1 | 7/2001 | DeVito |
| 6,292,688 B1 | 9/2001 | Patton |
| 6,309,342 B1 | 10/2001 | Blazey et al. |
| 6,322,368 B1 | 11/2001 | Young et al. |
| 6,585,521 B1 | 7/2003 | Obrador |
| 6,623,428 B2 | 9/2003 | Miller et al. |
| 6,626,676 B2 | 9/2003 | Freer |
| 6,652,283 B1 | 11/2003 | Van Schaack et al. |
| 6,656,116 B2 | 12/2003 | Kim et al. |
| 6,678,866 B1 | 1/2004 | Sugimoto et al. |
| 6,792,304 B1 | 9/2004 | Silberstein |
| 6,839,682 B1 | 1/2005 | Blume |
| 6,978,115 B2 | 12/2005 | Whitehurst et al. |
| 7,035,685 B2 | 4/2006 | Ryu et al. |
| 7,050,753 B2 | 5/2006 | Knutson |
| 7,113,916 B1 | 9/2006 | Hill |
| D565,735 S | 4/2008 | Washbon |
| 2001/0016874 A1 | 8/2001 | Ono et al. |
| 2001/0056225 A1 | 12/2001 | DeVito |
| 2002/0065826 A1* | 5/2002 | Bell et al. ......................... 707/10 |
| 2002/0154833 A1 | 10/2002 | Koch et al. |
| 2002/0182574 A1 | 12/2002 | Freer |
| 2003/0003433 A1 | 1/2003 | Carpenter et al. |
| 2003/0063780 A1 | 4/2003 | Gutta et al. |
| 2003/0076369 A1 | 4/2003 | Resner |
| 2003/0081834 A1 | 5/2003 | Philomin et al. |
| 2003/0093784 A1 | 5/2003 | Dimitrova et al. |
| 2003/0126593 A1 | 7/2003 | Mault |
| 2003/0153841 A1 | 8/2003 | Kilborn et al. |
| 2003/0165270 A1* | 9/2003 | Endrikhovski et al. ........ 382/189 |
| 2003/0172374 A1* | 9/2003 | Vinson et al. ..................... 725/9 |
| 2004/0018476 A1 | 1/2004 | Ladue |
| 2004/0039268 A1 | 2/2004 | Barbour et al. |
| 2004/0072133 A1 | 4/2004 | Kullock et al. |
| 2004/0187167 A1* | 9/2004 | Maguire et al. ............... 725/135 |
| 2004/0208496 A1 | 10/2004 | Pilu |
| 2004/0267141 A1 | 12/2004 | Amano et al. |
| 2005/0010087 A1 | 1/2005 | Banet |
| 2005/0043774 A1 | 2/2005 | Devlin et al. |
| 2005/0045189 A1 | 3/2005 | Jay |
| 2005/0066307 A1 | 3/2005 | Madhu et al. |
| 2005/0071865 A1 | 3/2005 | Martins |
| 2005/0097594 A1 | 5/2005 | O'Donnell et al. |
| 2005/0113656 A1 | 5/2005 | Chance |
| 2005/0172311 A1 | 8/2005 | Hjelt et al. |
| 2005/0289582 A1* | 12/2005 | Tavares et al. .................. 725/10 |
| 2006/0258926 A1 | 11/2006 | Ali et al. |
| 2006/0277102 A1 | 12/2006 | Agliozzo |
| 2006/0293921 A1 | 12/2006 | McCarthy et al. |
| 2007/0053513 A1 | 3/2007 | Hoffberg |
| 2007/0055169 A1 | 3/2007 | Lee et al. |
| 2007/0060830 A1 | 3/2007 | Le et al. |
| 2007/0060831 A1 | 3/2007 | Le et al. |
| 2007/0066914 A1 | 3/2007 | Le et al. |
| 2007/0116037 A1 | 5/2007 | Moore |
| 2007/0162505 A1* | 7/2007 | Cecchi et al. .............. 707/104.1 |
| 2007/0168461 A1 | 7/2007 | Moore |
| 2007/0173733 A1 | 7/2007 | Le et al. |
| 2007/0179396 A1 | 8/2007 | Le et al. |
| 2007/0184420 A1 | 8/2007 | Mathan et al. |
| 2007/0225585 A1 | 9/2007 | Washbon et al. |
| 2007/0235716 A1 | 10/2007 | Delic et al. |
| 2007/0238945 A1 | 10/2007 | Delic et al. |
| 2007/0250846 A1* | 10/2007 | Swix et al. ...................... 725/10 |
| 2007/0265507 A1 | 11/2007 | De Lemos |
| 2008/0091512 A1* | 4/2008 | Marci et al. ..................... 705/10 |
| 2008/0144882 A1 | 6/2008 | Leinbach et al. |
| 2008/0147488 A1* | 6/2008 | Tunick et al. ................... 705/10 |
| 2008/0159365 A1 | 7/2008 | Dubocanin et al. |
| 2008/0177197 A1 | 7/2008 | Lee et al. |
| 2008/0211768 A1 | 9/2008 | Breen et al. |
| 2008/0218472 A1 | 9/2008 | Breen et al. |
| 2009/0024049 A1 | 1/2009 | Pradeep et al. |
| 2009/0024447 A1 | 1/2009 | Pradeep et al. |
| 2009/0024448 A1 | 1/2009 | Pradeep et al. |
| 2009/0024449 A1 | 1/2009 | Pradeep et al. |
| 2009/0024475 A1 | 1/2009 | Pradeep et al. |
| 2009/0025023 A1 | 1/2009 | Pradeep et al. |
| 2009/0030287 A1 | 1/2009 | Pradeep et al. |
| 2009/0030303 A1 | 1/2009 | Pradeep et al. |
| 2009/0030717 A1 | 1/2009 | Pradeep et al. |
| 2009/0030930 A1 | 1/2009 | Pradeep et al. |
| 2009/0036755 A1 | 2/2009 | Pradeep et al. |
| 2009/0036756 A1 | 2/2009 | Pradeep et al. |
| 2009/0062629 A1 | 3/2009 | Pradeep et al. |
| 2009/0062681 A1 | 3/2009 | Pradeep et al. |
| 2009/0063255 A1 | 3/2009 | Pradeep et al. |
| 2009/0063256 A1 | 3/2009 | Pradeep et al. |
| 2009/0082643 A1 | 3/2009 | Pradeep et al. |
| 2009/0083129 A1 | 3/2009 | Pradeep et al. |
| 2009/0105576 A1 | 4/2009 | Do et al. |
| 2009/0112077 A1 | 4/2009 | Nguyen et al. |
| 2009/0156925 A1 | 6/2009 | Jin et al. |
| 2009/0214060 A1 | 8/2009 | Chuang et al. |
| 2009/0222330 A1 | 9/2009 | Leinbach |

FOREIGN PATENT DOCUMENTS

| | | |
|---|---|---|
| KR | 10-2001-0104579 | 11/2001 |

OTHER PUBLICATIONS

Form PCT/ISA/220, PCT/US07/14955, "PCT Notification of Transmittal of The International Search Report and the Written Opinion of the International Searching Authority, or the Declaration," 1 pg.

Form PCT/ISA/210, PCT/US07/14955, "PCT International Search Report," 2 pgs.

Form PCT/ISA/237, PCT/US07/14955, "PCT Written Opinion of the International Searching Authority," 6 pgs.

Form PCT/IB/326, PCT/US07/14955, "Notification Concerning Transmittal of International Preliminary Report on Patentability." 1 page.

Form PCT/IB/373, PCT/US07/14955, "International Preliminary Report on Patentability." 1 page.

Form PCT/ISA/220, PCT/US07/16796, "PCT Notification of Transmittal of The International Search Report and the Written Opinion of the International Searching Authority, or the Declaration," 1 pg.

Form PCT/ISA/210, PCT/US07/16796, "PCT International Search Report," 2 pgs.

Form PCT/ISA/237, PCT/US07/16796, "PCT Written Opinion of the International Searching Authority," 6 pgs.

Form PCT/IB/326, PCT/US07/16796, "Notification Concerning Transmittal of International Preliminary Report on Patentability." 1 page.

Form PCT/IB/373, PCT/US07/16796, "International Preliminary Report on Patentability." 1 page.

Form PCT/ISA/220, PCT/US06/31569, "PCT Notification of Transmittal of The International Search Report and the Written Opinion of the International Searching Authority, or the Declaration," 1 pg.

Form PCT/ISA/210, PCT/US06/31569, "PCT International Search Report," 3 pgs.

Form PCT/ISA/237, PCT/US06/31569, "PCT Written Opinion of the International Searching Authority," 6 pgs.

Form PCT/IB/326, PCT/US06/31569, "Notification Concerning Transmittal of International Preliminary Report on Patentability." 1 page.

Form PCT/IB/373, PCT/US06/31569, "International Preliminary Report on Patentability." 1 page.

Form PCT/ISA/220, PCT/US07/20714, "PCT Notification of Transmittal of the International Search Report and The Written Opinion of the International Searching Authority, or the Declaration," 1 pg.
Form PCT/ISA/210, PCT/US07/20714, "PCT International Search Report," 2 pgs.
Form PCT/ISA/237, PCT/US07/20714, "PCT Written Opinion of the International Searching Authority," 6 pgs.
Form PCT/IB/326, PCT/US07/20714, "Notification Concerning Transmittal of International Preliminary Report on Patentability." 1 page.
Form PCT/IB/373, PCT/US07/20714, "International Preliminary Report on Patentability." 1 page.
Form PCT/ISA/220, PCT/US07/17764, "PCT Notification of Transmittal of The International Search Report and the Written Opinion of the International Searching Authority, or the Declaration," 1 pg.
Form PCT/ISA/210, PCT/US07/17764, "PCT International Search Report," 2 pgs.
Form PCT/ISA/237, PCT/US07/17764, "PCT Written Opinion of the International Searching Authority," 7 pgs.
Form PCT/IB/326, PCT/US07/17764, "Notification Concerning Transmittal of International Preliminary Report on Patentability." 1 page.
Form PCT/IB/373, PCT/US07/17764, "International Preliminary Report on Patentability." 1 page.
Form PCT/ISA/220, PCT/US07/20713, "PCT Notification of Transmittal of The International Search Report and the Written Opinion of the International Searching Authority, or the Declaration," 1 pg.
Form PCT/ISA/210, PCT/US07/20713, "PCT International Search Report," 2 pgs.
Form PCT/ISA/237, PCT/US07/20713, "PCT Written Opinion of the International Searching Authority," 5 pgs.
Form PCT/IB/326, PCT/US07/20713, "Notification Concerning Transmittal of International Preliminary Report on Patentability." 1 page.
Form PCT/IB/373, PCT/US07/20713, "International Preliminary Report on Patentability." 1 page.
Form PCT/ISA/220, PCT/US08/09110, "PCT Notification of Transmittal of The International Search Report and the Written Opinion of the International Searching Authority, or the Declaration," 1 pg.
Form PCT/ISA/210, PCT/US08/09110, "PCT International Search Report," 3 pgs.
Form PCT/ISA/237, PCT/US08/09110, "PCT Written Opinion of the International Searching Authority," 4 pgs.
Form PCT/ISA/220, PCT/US08/75640, "PCT Notification of Transmittal of The International Search Report and the Written Opinion of the International Searching Authority, or the Declaration," 1 pg.
Form PCT/ISA/210, PCT/US08/75640, "PCT International Search Report," 2 pgs.
Form PCT/ISA/237, PCT/US08/75640, "PCT Written Opinion of the International Searching Authority," 3 pgs.
Form PCT/ISA/220, PCT/US08/78633, "PCT Notification of Transmittal of The International Search Report and the Written Opinion of the International Searching Authority, or the Declaration," 1 pg.
Form PCT/ISA/210, PCT/US08/78633, "PCT International Search Report," 2 pgs.
Form PCT/ISA/237, PCT/US08/78633, "PCT Written Opinion of the International Searching Authority," 6 pgs.
Form PCT/ISA/220, PCT/US08/82147, "PCT Notification of Transmittal of The International Search Report and the Written Opinion of the International Searching Authority, or the Declaration," 1 pg.
Form PCT/ISA/210, PCT/US08/82147, "PCT International Search Report," 2 pgs.
Form PCT/ISA/237, PCT/US08/82147, "PCT Written Opinion of the International Searching Authority," 13 pgs.
Form PCT/ISA/220, PCT/US08/82149, "PCT Notification of Transmittal of The International Search Report and the Written Opinion of the International Searching Authority, or the Declaration," 1 pg.
Form PCT/ISA/210, PCT/US08/82149, "PCT International Search Report," 2 pgs.
Form PCT/ISA/237, PCT/US08/82149, "PCT Written Opinion of the International Searching Authority," 14 pgs.

Form PCT/ISA/220, PCT/US08/75651, "PCT Notification of Transmittal of The International Search Report and the Written Opinion of the International Searching Authority, or the Declaration," 1 pg.
Form PCT/ISA/210, PCT/US08/75651, "PCT International Search Report," 2 pgs.
Form PCT/ISA/237, PCT/US08/75651, "PCT Written Opinion of the International Searching Authority," 9 pgs.
Form PCT/ISA/220, PCT/US08/85723, "PCT Notification of Transmittal of The International Search Report and the Written Opinion of the International Searching Authority, or the Declaration," 1 pg.
Form PCT/ISA/210, PCT/US08/85723, "PCT International Search Report," 2 pgs.
Form PCT/ISA/237, PCT/US08/85723, "PCT Written Opinion of the International Searching Authority," 7 pgs.
Form PCT/ISA/220, PCT/US08/85203, "PCT Notification of Transmittal of The International Search Report and the Written Opinion of the International Searching Authority, or the Declaration," 1 pg.
Form PCT/ISA/210, PCT/US08/85203, "PCT International Search Report," 2 pgs.
Form PCT/ISA/237, PCT/US08/85203, "PCT Written Opinion of the International Searching Authority," 6 pgs.
Form PCT/ISA/220, PCT/US08/75649, "PCT Notification of Transmittal of The International Search Report and the Written Opinion of the International Searching Authority, or the Declaration," 1 pg.
Form PCT/ISA/210, PCT/US08/75649, "PCT International Search Report," 3 pgs.
Form PCT/ISA/237, PCT/US08/75649, "PCT Written Opinion of the International Searching Authority," 5 pgs.
Technology Platform: SmartShirt + Eye-Tracking Innerscope Research, Mar. 2007.
Egner, Tobias; Emilie Strawson, and John H. Gruzelier, "EEG Signature and Phenomenology of Alpha/theta Neurofeedback Training Versus Mock Feedback." Applied Psychophysiology and Biofeedback. vol. 27, No. 4. Dec. 2002.
Clarke, Adam R. et al., EEG Analysis of Children with Attention-Deficit/Hyperactivity Disorder and Comorbid Reading Disabilities, Journal of Learning Disabilities, vol. 35, No. 3, (May-Jun. 2002), pp. 276-285.
Carter, R., "Mapping the Mind" 1998 p. 182 University of California Press, Berkley.
Harmony et al. (2004) Specific EEG frequencies signal general common cognitive processes as well as specific tasks processes in man. Int. Journal of Psychophysiology 53(3): 207-16.
Klimesch, W., Schimke, H., Schwaiger, J. (1994) Episodic and semantic memory: an analysis in the EEG theta and alpha band. Electroencephalography Clinical Neurophysiology.
Mizuhara, H.,Wang LQ, Kobayashi, K., Yamaguchi, Y., (2004) A long range cortical network emerging with theta oscillation in mental task. Neuroreport 15(8): 1233-1238.
Selden, G (1981) "Machines that Read Minds." Science Digest, October.
Willis, M. & Hodson, V.; Discover Your Child's Learning Style: Children Learn in Unique Ways—Here's the Key to Every Child's Learning Success, Prime Publishing. Roseville, CA.
Wise, A (1996) The High Performance Mind, Mastering Brainwaves for Insight, Healing and Creativity. G.P. Putnam's Son, NewYork. pp. 13-15; 20-22; 143-156.
Wise, A (1996) The High Performance Mind, Mastering Brainwaves for Insight, Healing and Creativity. G.P. Putnam's Son, NewYork. pp. 156-158; 165-170; 186-187, 189-192.
El-Bab, M. (2001) Cognitive event related potentials during a learning task. Doctoral Dissertation, Faculty of Medicine, University of Southampton, UK.
Gevins et al. (1997) High resolution EEG mapping of cortical activation related to a working memory, Cereb Cortex. 7: 374-385.
Hughes, J.R. & John, E.R. (1999) Conventional and Quantitative Electroencephalography in Psychiatry. Journal of Neuropsychiatry and Clinical Neurosciences. vol. 11(2): 190-208.

* cited by examiner fun  cool  boring new  confusing  interesting  dark mysterious  engaging  suspenseful beautiful  alien  stunning  intense  futuristic  entertaining dumb  adventurous  over  smooth  vivid  fantasy quality  corny action-packed adventure

FIG.16

SYSTEM FOR REMOTE ACCESS TO MEDIA, AND REACTION AND SURVEY DATA FROM VIEWERS OF THE MEDIA

RELATED APPLICATIONS

This application claims the benefit of U.S. Patent Application No. 60/977,035, filed Oct. 2, 2007.
This application claims the benefit of U.S. Patent Application No. 60/977,040, filed Oct. 2, 2007.
This application claims the benefit of U.S. Patent Application No. 60/977,042, filed Oct. 2, 2007.
This application claims the benefit of U.S. Patent Application No. 60/977,045, filed Oct. 2, 2007.
This application claims the benefit of U.S. Patent Application No. 60/984,260, filed Oct. 31, 2007.
This application claims the benefit of U.S. Patent Application No. 60/984,268, filed Oct. 31, 2007.
This application claims the benefit of U.S. Patent Application No. 60/991,591, filed Nov. 30, 2007.
This application is related to U.S. patent application Ser. Nos. 11/681,265, filed Mar. 2, 2007, 11/804,517, filed May 17, 2007, 11/779,814, filed Jul. 18, 2007, 11/846,068, filed Aug. 28, 2007, and 11/959,399, filed Dec. 18, 2007.

TECHNICAL FIELD

This invention relates to the field of analysis of physiological responses from viewers of media instances.

BACKGROUND

A key to creating a high performing media instance is to ensure that every event in the media elicits the desired responses from viewers. Here, the media instance can be but is not limited to, a video game, an advertisement clip, a movie, a computer application, a printed media (e.g., a magazine), a website, an online advertisement, a recorded video, a live performance of media, and other types of media.

Physiological data, which includes but is not limited to heart rate, brain waves, electroencephalogram (EEG) signals, blink rate, breathing, motion, muscle movement, galvanic skin response and any other response correlated with changes in emotion of a viewer of a media instance, can give a trace (e.g., a line drawn by a recording instrument) of the viewer's responses while he/she is watching the media instance. The physiological data can be measure by one or more physiological sensors, each of which can be but is not limited to, an electroencephalogram, electrocardiogram, an accelerometer, a blood oxygen sensor, a galvanometer, an electromyograph, skin temperature sensor, breathing sensor, eye tracking, pupil dilation sensing, and any other physiological sensor.

It is well established that physiological data in the human body of a viewer correlates with the viewer's change in emotions. Thus, from the measured "low level" physiological data, "high level" (e.g., easier to understand, intuitive to look at) physiological responses from the viewers of the media instance can be created. An effective media instance that connects with its audience/viewers is able to elicit the desired emotional response. Here, the high level physiological responses include, but are not limited to, liking (valence)—positive/negative responses to events in the media instance, intent to purchase or recall, emotional engagement in the media instance, thinking—amount of thoughts and/or immersion in the experience of the media instance, and adrenaline—anger, distraction, frustration, and other emotional experiences to events in the media instance, and tension and stress.

Advertisers, media producers, educators, scientists, engineers, doctors and other relevant parties have long desired to have greater access to collected reactions to their media products and records of responses through a day from their targets, customers, clients and pupils. These parties desire to understand the responses people have to their particular stimulus in order to tailor their information or media instances to better suit the needs of end users and/or to increase the effectiveness of the media instance created. Making the reactions to the media instances available remotely over the Web to these interested parties has potentially very large commercial and socially positive impacts. Consequently, allowing a user to remotely access and analyze the media instance and the physiological responses from numerous viewers to the media instance is desired.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 16 shows an exemplary word cloud presenting key words and concepts from the viewers of the media instance.

DETAILED DESCRIPTION

Figure 1:
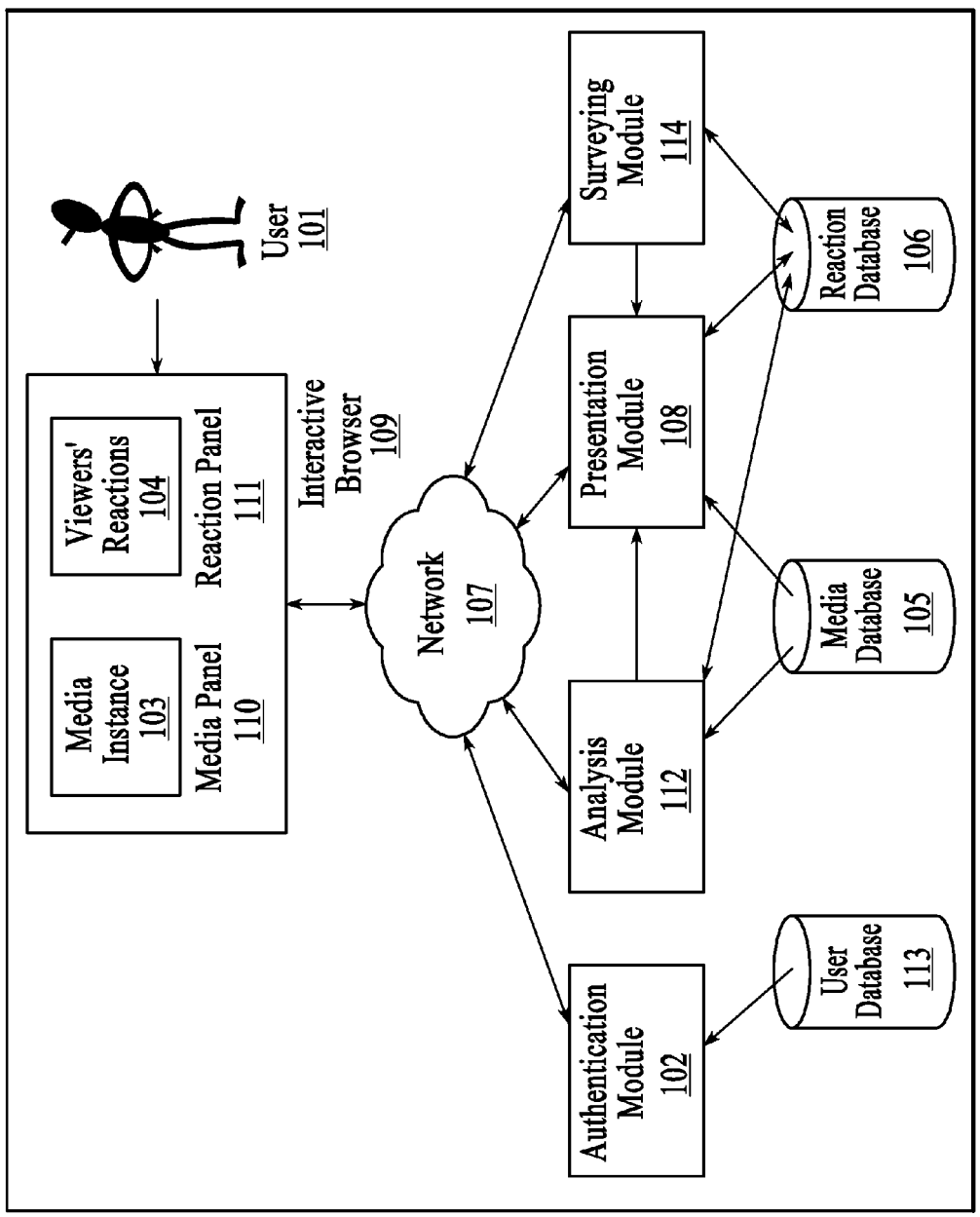
FIG. 1 is an illustration of an exemplary system to support remote access and analysis of media and reactions from viewers.

An embodiment enables remote and interactive access, navigation, and analysis of reactions from one or more viewers to a specific media instance. Here, the reactions include, but are not limited to, physiological responses, survey results, verbatim feedback, event-based metadata, and derived statistics for indicators of success and failure from the viewers. The reactions from the viewers are aggregated and stored in a database and are delivered to a user via a web-based graphical interface or application, such as a Web browser. Through the web-based graphical interface, the user is able to remotely access and navigate the specific media instance, together with one or more of: the aggregated physiological responses that have been synchronized with the media instance, the survey results, and the verbatim feedbacks related to the specific media instance. Instead of being presented with static data (such as a snapshot) of the viewers' reactions to the media instance, the user is now able to interactively divide, dissect, parse, and analysis the reactions in any way he/she prefer. The embodiments herein provides automation that enables those who are not experts in the field of physiological analysis to understand and use physiological data by enabling these non-experts to organize the data and organize and improve presentation or visualization of the data according to their specific needs. In this manner, the embodiments herein provide an automated process that enables non-experts to understand complex data, and to organize the complex data in such a way as to present conclusions as appropriate to the media instance.

In the following description, numerous specific details are introduced to provide a thorough understanding of, and enabling description for, embodiments of the systems and methods. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Having multiple reactions from the viewers (e.g., physiological responses, survey results, verbatim feedback, events tagged with metadata, etc.) available in one place and at a user's fingertips, along with the automated methods for aggregating the data provided herein, allows the user to view the reactions to hundreds of media instances in one sitting by navigating through them. For each of the media instances, the integration of multiple reactions provides the user with more information than the sum of each of the reactions to the media instance. For a non-limiting example, if one survey says that an ad is bad, that is just information; but if independent surveys, verbatim feedbacks and physiological data across multiple viewers say the same, the reactions to the media instance become more trustworthy. By combining this before a user sees it, the correct result is presented to the user.

FIG. 1 is an illustration of an exemplary system to support automated remote access and analysis of media and reactions from viewers, under an embodiment. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, an authentication module 102 is operable to authenticate identity of a user 101 requesting access to a media instance 103 together with one or more reactions 104 from a plurality of viewers of the media instance remotely over a network 107. Here, the media instance and its pertinent data can be stored in a media database 105, and the one or more reactions from the viewers can be stored in a reaction database 106, respectively. The network 107 can be, but is not limited to, one or more of the internet, intranet, wide area network (WAN), local area network (LAN), wireless network, Bluetooth, and mobile communication networks. Once the user is authenticated, a presentation module 108 is operable to retrieve and present the requested information (e.g., the media instance together with one or more reactions from the plurality of viewers) to the user via an interactive browser 109. The interactive browser 109 comprises at least two panels including a media panel 110, which is operable to present, play, and pause the media instance, and a response panel 111, which is operable to display the one or more reactions corresponding to the media instance, and provide the user with a plurality of features to interactively divide, dissect, parse, and analysis the reactions.

Figure 2:
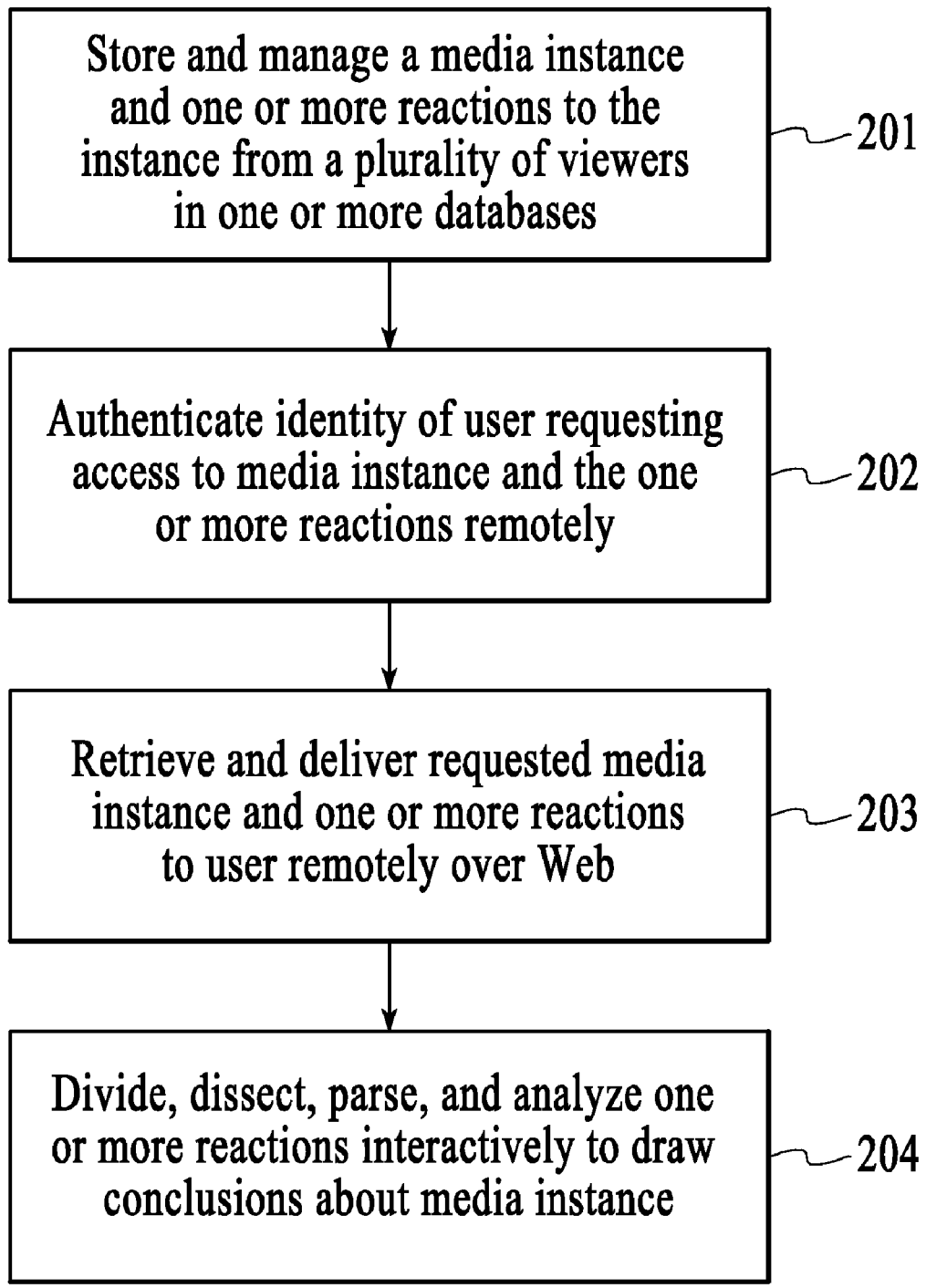
FIG. 2 is a flow chart illustrating an exemplary process to support remote access and analysis of media and reactions from viewers.

FIG. 2 is a flow chart illustrating an exemplary process to support remote access and analysis of media and reactions from viewers. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a media instance and one or more reactions to the instance from a plurality of viewers are stored and managed in one or more databases at step 201. Data or information of the reactions to the media instance is obtained or gathered from each user via a sensor headset, one example of which is described in U.S. patent application Ser. No. 12/206,676, filed Sep. 8, 2008, U.S. patent application Ser. No. 11/804,517, filed May 17, 2007, and U.S. patent application Ser. No. 11/681,265, filed Mar. 2, 2007. At step 202, the identity of a user requesting access to the media instance and the one or more reactions remotely is authenticated. At step 203, the requested media instance and the one or more reactions are retrieved and delivered to the user remotely over a network (e.g., the Web). At step 204, the user may interactively aggregate, divide, dissect, parse, and analyze the one or more reactions to draw conclusions about the media instance.

In some embodiments, alternative forms of access to the one or more reactions from the viewers other than over the network may be adopted. For non-limiting examples, the reactions can be made available to the user on a local server on a computer or on a recordable media such as a DVD disc with all the information on the media.

In some embodiments, with reference to FIG. 1, an optional analysis module 112 is operable to perform in-depth analysis on the viewers' reactions to a media instance as well as the media instance itself (e.g., dissecting the media instance into multiple scenes/events/sections). Such analysis provides the user with information on how the media instance created by the user is perceived by the viewers. In addition, the analysis module is also operable to categorize viewers' reactions into the plurality of categories.

In some embodiments, user database 113 stores information of users who are allowed to access the media instances and the reactions from the viewers, and the specific media instances and the reactions each user is allowed to access. The access module 106 may add or remove a user for access, and limit or expand the list of media instances and/or reactions the user can access and/or the analysis features the user can use by checking the user's login name and password. Such authorization/limitation on a user's access can be determined to based upon who the user is, e.g., different amounts of information for different types of users. For a non-limiting example, Company ABC can have access to certain ads and survey results of viewers' reactions to the ads, which Company XYZ can not or have only limited access to.

Figure 3:
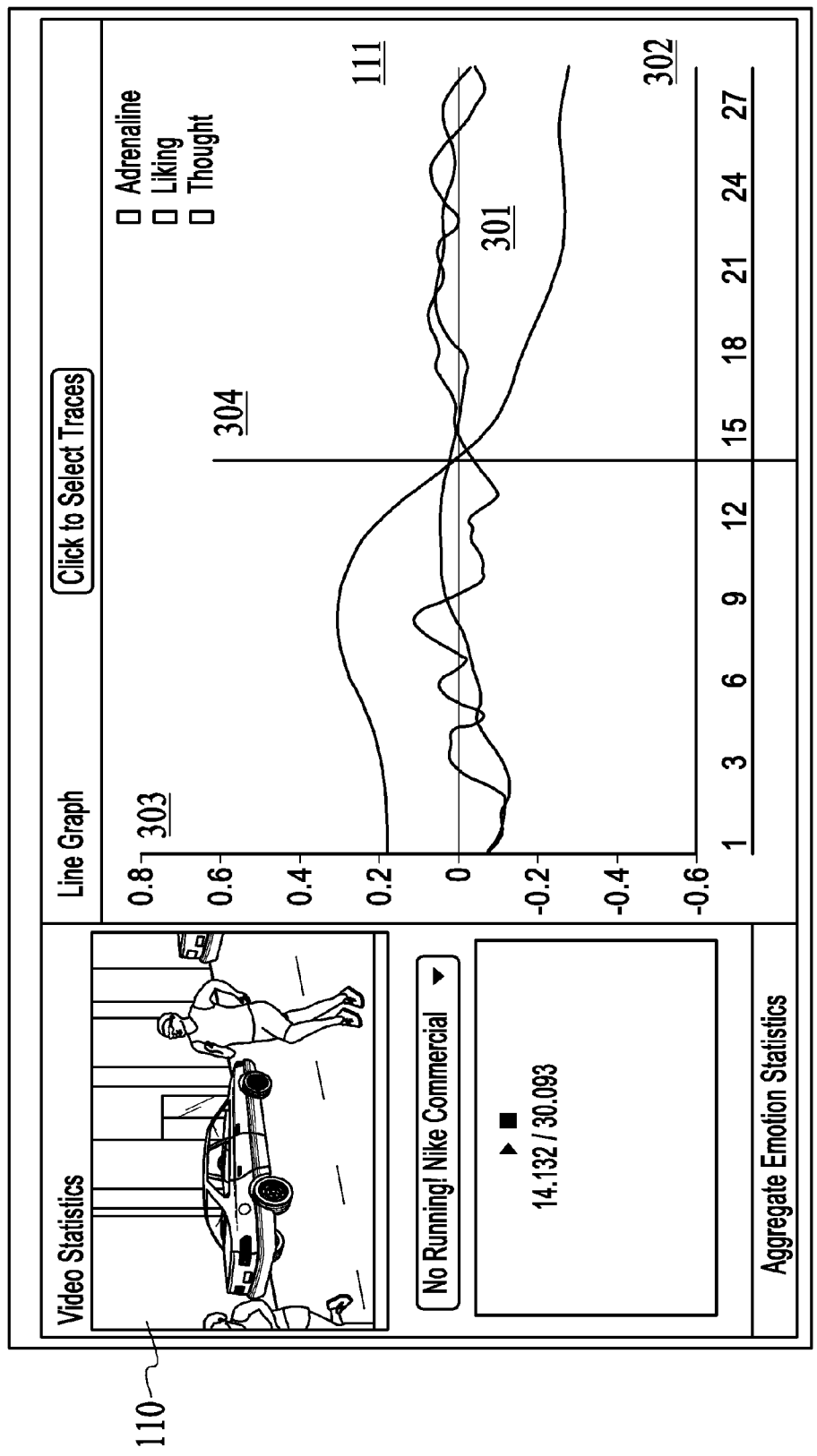
FIG. 3 shows one or more exemplary physiological responses aggregated from the viewers and presented in the response panel of the interactive browser.

In some embodiments, one or more physiological responses aggregated from the viewers can be presented in the response panel 111 as lines or traces 301 in a two-dimensional graph or plot as shown in FIG. 3. Horizontal axis 302 of the graph represents time, and vertical axis 303 of the graph represents the amplitude (intensity) of the one or more physiological responses. Here, the one or more physiological responses are aggregated over the viewers via one or more of: max, min, average, deviation, or a higher ordered approximation of the intensity of the physiological responses from the viewers. The responses are synchronized with the media instance at each and every moment over the entire duration of the media instance, allowing the user to identify the second-by second changes in viewers' emotions and their causes. A cutting line 304 marks the physiological responses from the viewers corresponding to the current scene (event, section, or moment in time) of the media instance. The cutting line moves in coordination with the media instance being played.

In some embodiments, change (trend) in amplitude of the aggregated responses is also a good measure of the quality of the media instance. If the media instance is able to change viewers emotions up and down in a strong manner (for a non-limiting example, mathematical deviation of the response is large), such strong change in amplitude corresponds to a good media instance that puts the viewers into different emotional states. In contrast, a poor performing media instance does not put the viewers into different emotional states. The amplitudes and the trend of the amplitudes of the responses are good measures of the quality of the media instance. Such information can be used by media designers to identify if the media instance is eliciting the desired response and which key events/scenes/sections of the media instance need to be changed in order to match the desired response. A good media instance should contain multiple moments/scenes/events that are intense and produce positive amplitude of response across viewers. A media instance that failed to create such responses may not achieve what the creators of the media instance have intended.

In some embodiments, other than providing a second by second view for the user to see how specific events in the media instance affect the viewers' emotions, the aggregated responses collected and calculated can also be used for the compilation of aggregate statistics, which are useful in ranking the overall affect of the media instance. Such statistics include but are not limited to Average Liking and Heart Rate Deviation.

Figure 4:
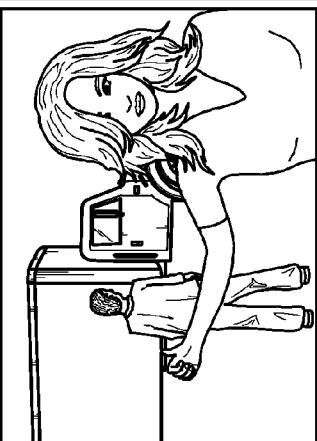
FIG. 4 shows exemplary verbatim comments and feedbacks collected from the viewers and presented in the response panel of the interactive browser.

In some embodiments, the viewers of the media instance are free to write comments (e.g., what they like, what they dislike, etc.) on the media instance, and the verbatim (free flowing text) comments or feedbacks 401 from the viewers can be recorded and presented in a response panel 111 as shown in FIG. 4. Such comments can be prompted, collected, and recorded from the viewers while they are watching the specific media instance and the most informative ones are put together and presented to the user. The user may then analyze, and digest keywords in the comments to obtain a more complete picture of the viewers' reactions. In addition, the user can search for specific keywords he/she is interested in about the media instance, and view only those comments containing the specified keywords.

In some embodiments, the viewers' comments about the media instance can be characterized as positive or negative in a plurality of categories/topics/aspects related to the product, wherein such categories include but are not limited to, product, event, logo, song, spokesperson, jokes, narrative, key events, storyline. These categories may not be predetermined, but instead be extracted from the analysis of their comments.

Figure 5:
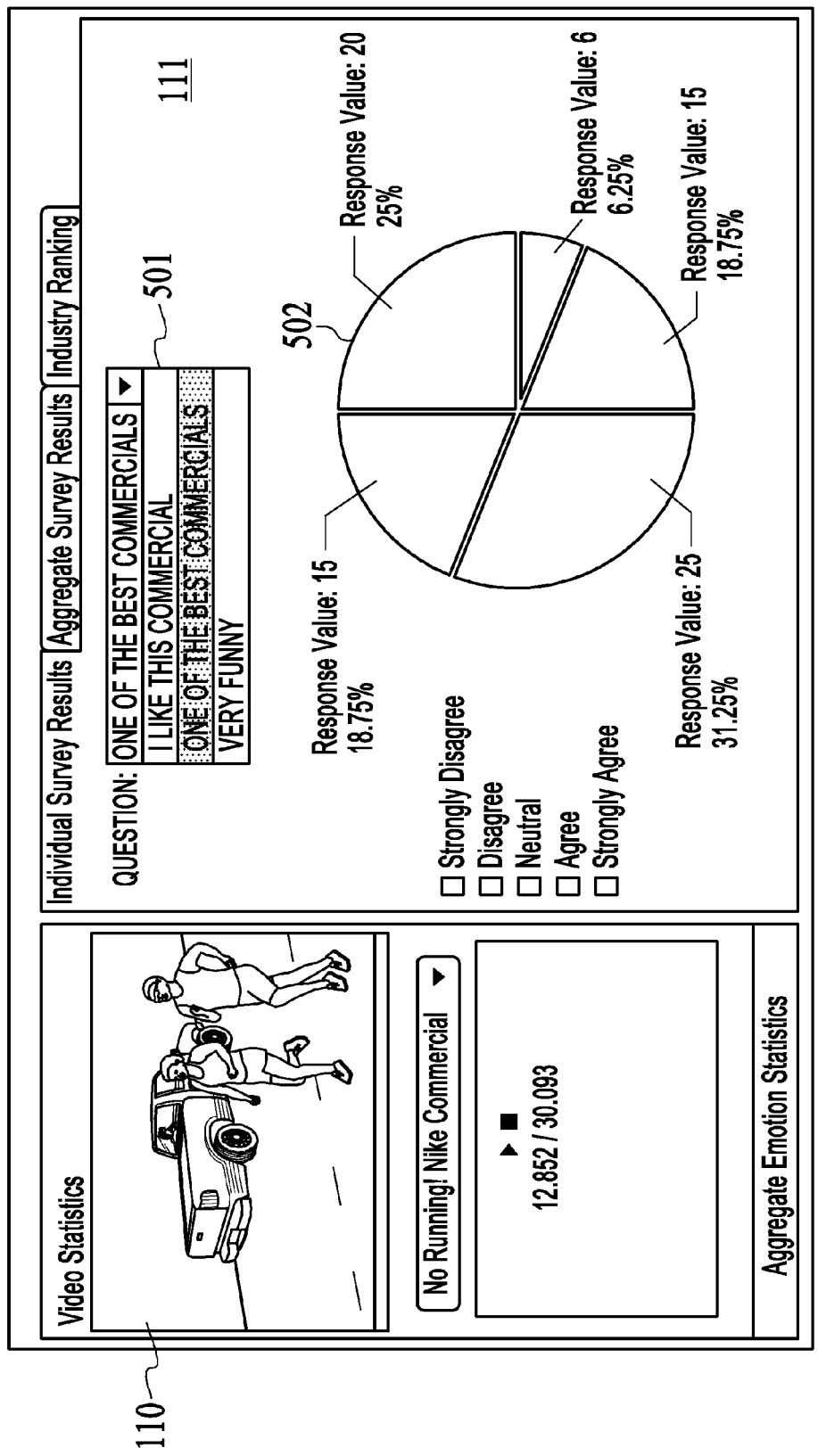
FIG. 5 shows exemplary answers to one or more survey questions collected from the viewers and presented as a pie chart in the response panel of the interactive browser.
Figure 6:
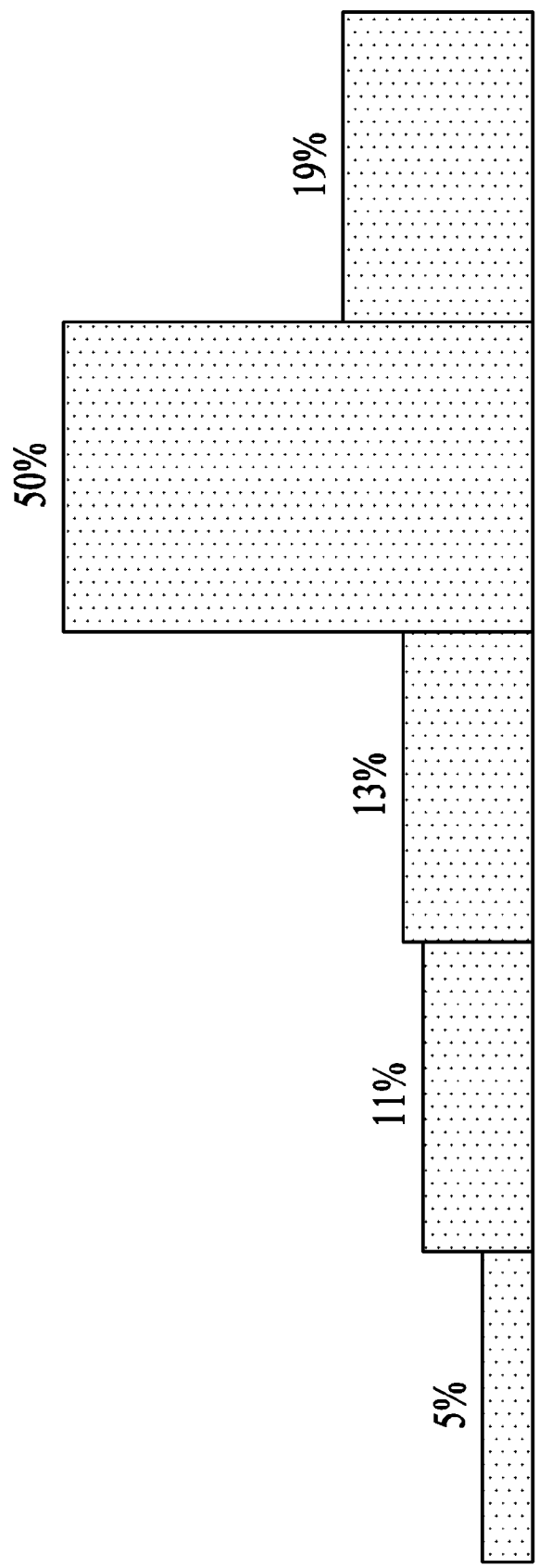
FIG. 6 shows exemplary answers to one or more survey questions collected from the viewers and presented as a histogram

In some embodiments, answers to one or more survey questions 501 aggregated from the viewers can be rendered graphically, for example, by being presented in the response panel 111 in a graphical format 502 as shown in FIG. 5 Alternatively, FIG. 6 is an exemplary histogram displaying the response distribution of viewers asked to rate an advertisement on a scale of 1-5. Here, the graphical format can be but is not limited to, a bar graph, a pie chart (e.g., as shown in FIG. 5), a histogram (e.g., as shown in FIG. 6), or any other suitable graph type.

In some embodiments, the survey questions can be posed or presented to the viewers while they are watching the specific media instance and their answers to the questions are collected, recorded, summed up by pre-defined categories via a surveying module 114. Once the survey results are made available to the user (creator of the media instance), the user may pick any of the questions, and be automatically presented with survey results corresponding to the question visually to the user. The user may then view and analyze how viewers respond to specific questions to obtain a more complete picture of the viewers' reactions.

Figure 7:
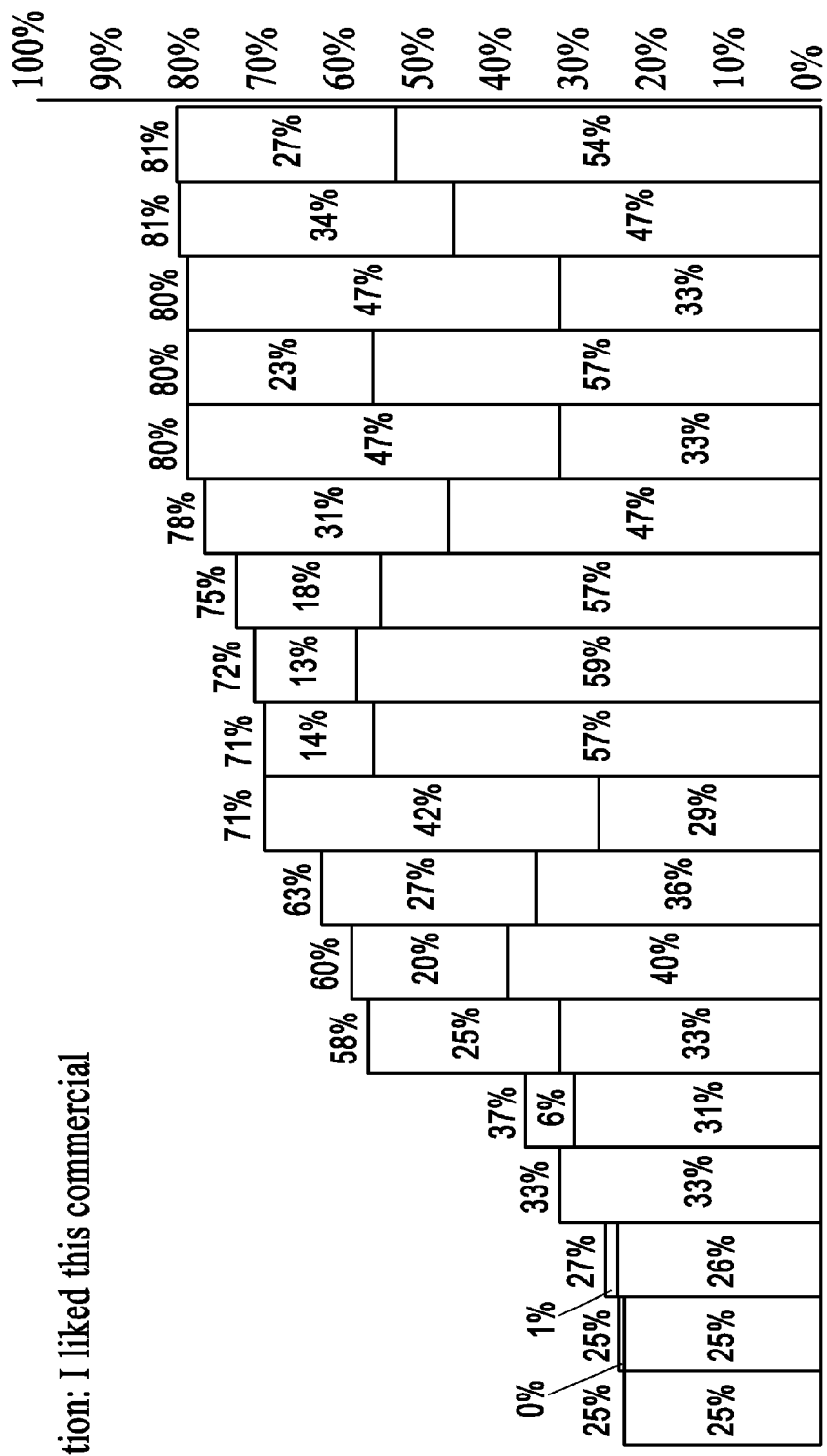
FIG. 7 shows an exemplary graph displaying the percentages of viewers who "liked" or "really liked" a set of advertisements.

In some embodiments, many different facets of the one or more reactions from the viewers described above can be blended into a few simple metrics that the user can use to see how it is currently positioned against the rest of their industry. For the user, knowing where it ranks in its industry in comparison to its competition is often the first step in getting to where it wants to be. For a non-limiting example, in addition to the individual survey results of a specific media instance, the surveying module may also provide the user with a comparison of survey results and statistics to multiple media instances. This automation allows the user not only to see the feedback that the viewers provided with respect to the specific media instance, but also to evaluate how the specific media instance compares to other media instances designed by the same user or its competitors. FIG. 7 shows an exemplary graph displaying the percentages of viewers who "liked" or "really liked" a set of advertisements, which helps to determine if a new ad is in the top quartile with respect to other ads.

An embodiment provides a user not only with tools for accessing and obtaining a maximum amount of information out of reactions from a plurality of viewers to a specific media instance, but also with actionable insights on what changes the user can make to improve the media instance based on in-depth analysis of the viewers' reactions. Such analysis requires expert knowledge on the viewers' physiological behavior and large amounts of analysis time, which the user may not possess. Here, the reactions include but are not limited to, physiological responses, survey results, and verbatim feedbacks from the viewers, to name a few. The reactions from the viewers are aggregated and stored in a database and presented to the user via a graphical interface, as described above. The embodiment includes predefined methods for extracting information from the reactions and presenting that information so that the user is not required to be an expert in physiological data analysis to reach and understand conclusions supported by the information. Making in-depth analysis of reactions to media instances and actionable insights available to a user enables a user who is not an expert in analyzing physiological data to obtain critical information that can have significant commercial and socially positive impacts.

Figure 8:
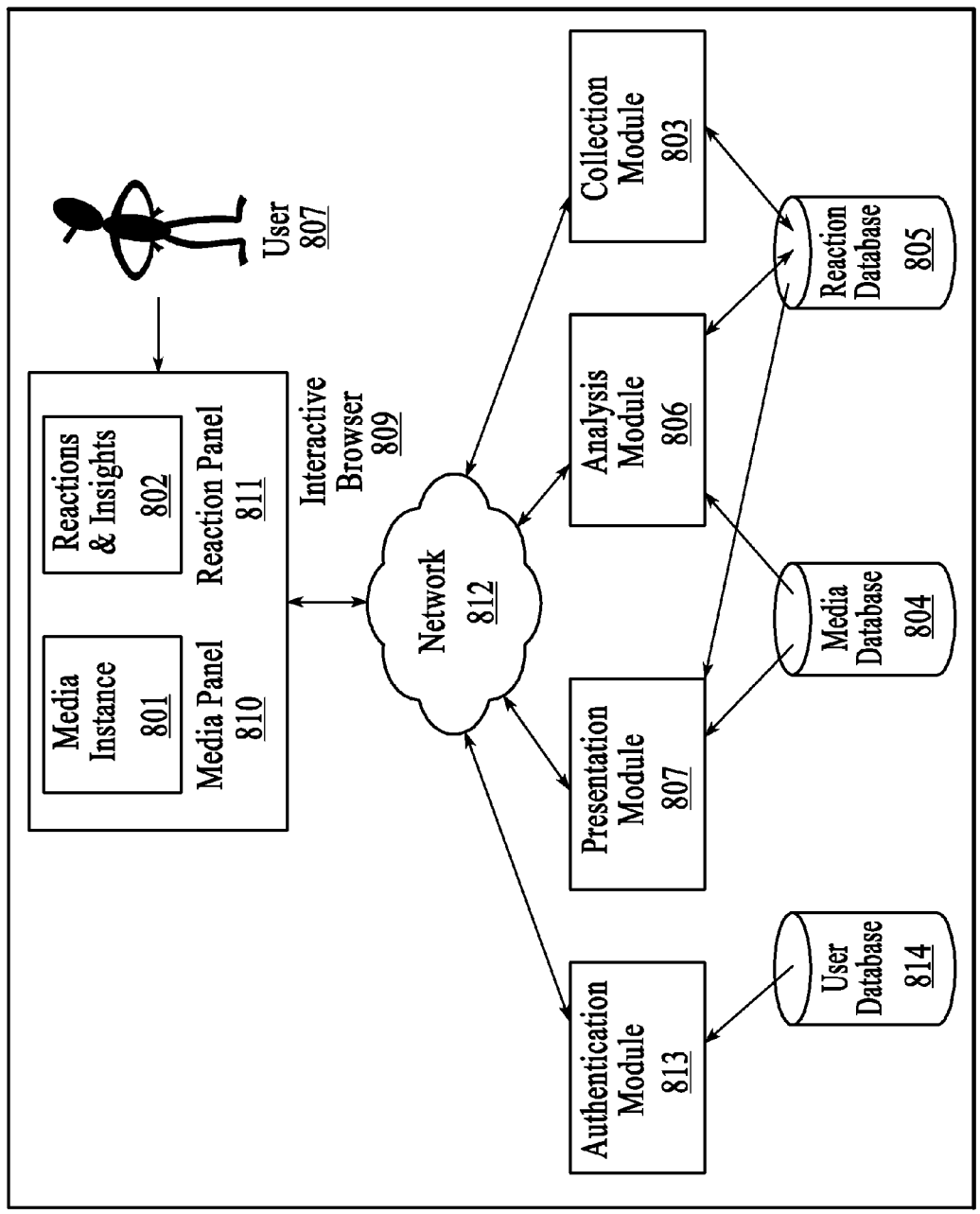
FIG. 8 is an illustration of an exemplary system to support providing actionable insights based on in-depth analysis of reactions from viewers.

FIG. 8 is an illustration of an exemplary system to support providing actionable insights based on in-depth analysis of reactions from viewers. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 8, a collection module 803 is operable to collect, record, store and manage one or more reactions 802 from a plurality of viewers of a media instance 801. The viewers from whom reactions 802 are collected can be in the same physical location or different physical locations. Additionally, the viewers can be viewing the media instance and the reactions collected at the same time, or at different times (e.g., viewer 1 is viewing the media instance at 9 AM while viewer 2 is viewing the media instance at 3 PM). Data or information of the reactions to the media instance is obtained or gathered from each user via a sensor headset. The sensor headset of an embodiment integrates sensors into a housing which can be placed on a human head for measurement of physiological data. The device includes at least one sensor and can include a reference electrode connected to the housing. A processor coupled to the sensor and the reference electrode receives signals that represent electrical activity in tissue of a user. The processor generates an output signal including data of a difference between an energy level in each of a first and second frequency band of the signals. The difference between energy levels is proportional to release level present time emotional state of the user. The headset includes a wireless transmitter that transmits the output signal to a remote device. The headset therefore processes the physiological data to create the output signal that correspond to a person's mental and emotional state (reactions or reaction data). An example of a sensor headset is described in U.S. patent application Ser. Nos. 12/206,676, filed Sep. 8, 2008, 11/804,517, filed May 17, 2007, and 11/681,265, filed Mar. 2, 2007.

The media instance and its pertinent data can be stored in a media database 804, and the one or more reactions from the viewers can be stored in a reaction database 805, respectively. An analysis module 806 performs in-depth analysis on the viewers' reactions and provides actionable insights on the viewers' reactions to a user 807 so that the user can draw its own conclusion on how the media instance can/should be improved. A presentation module 808 is operable to retrieve and present the media instance 801 together with the one or more reactions 802 from the viewers of the media instance via an interactive browser 809. Here, the interactive browser includes at least two panels—a media panel 810, operable to present, play, and pause the media instance, and a reaction panel 811, operable to display the one or more reactions corresponding to the media instance as well as the key insights provided by the analysis module 806.

Figure 9:
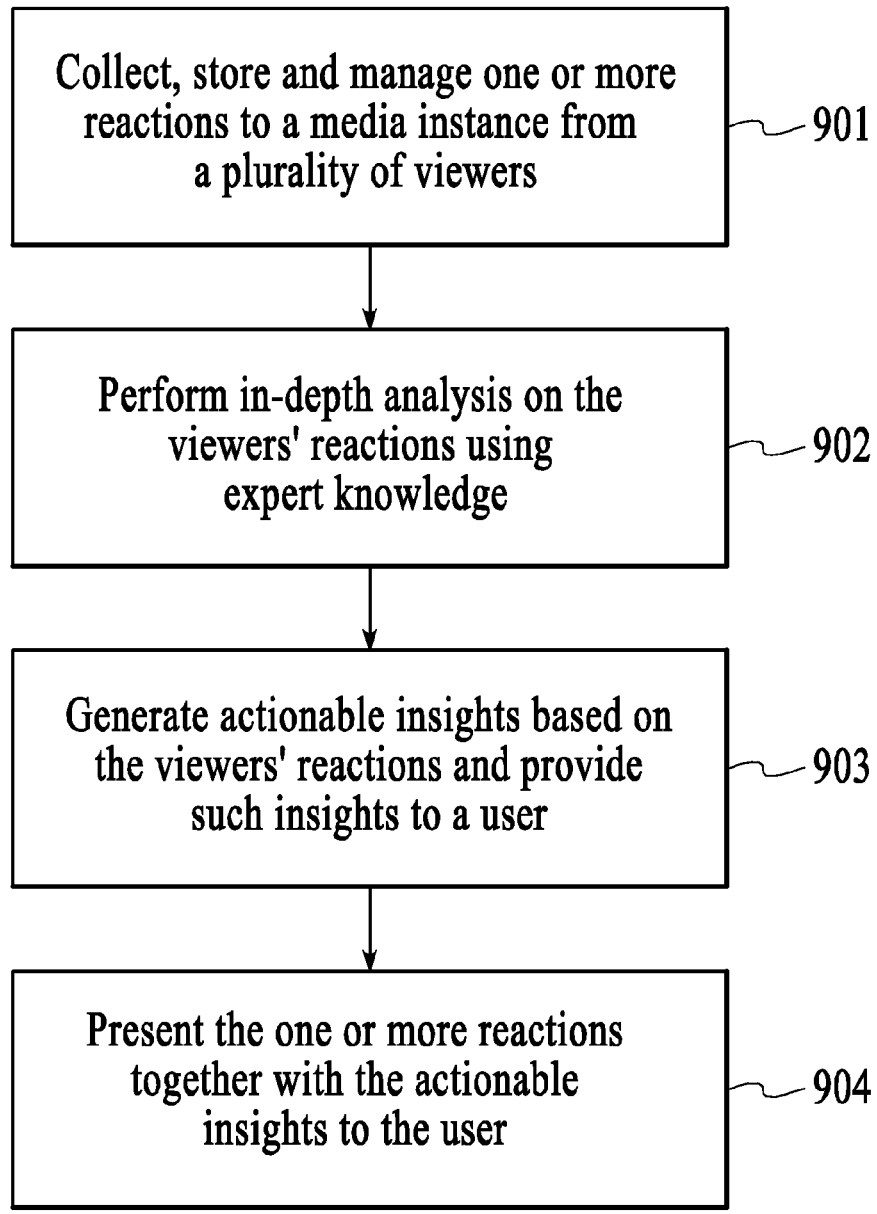
FIG. 9 is a flow chart illustrating an exemplary process to support providing actionable insights based on in-depth analysis of reactions from viewers.

FIG. 9 is a flow chart illustrating an exemplary automatic process to support providing actionable insights based on in-depth analysis of reactions from viewers. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 9, one or more reactions to a media instance from a plurality of viewers are collected, stored and managed in one or more databases at step 901. At step 902, in-depth analysis is performed on the viewers' reactions using expert knowledge, and actionable insights are generated based on the viewers' reactions and provided to a user at step 903 so that the user can draw its own conclusion on the media instance can/should be improved. At step 904, the one or more reactions can be presented to the user together with the actionable insights to enable the user to draw its own conclusions about the media instance. The configuration used to present the reactions and actionable insights can be saved and tagged with corresponding information, allowing it to be recalled and used for similar analysis in the future.

In some embodiments, the analysis module is operable to provide insights or present data based in-depth analysis on the viewers' reactions to the media instance on at least one question. An example question is whether the media instance performs most effectively across all demographic groups or especially on a specific demographic group, e.g., older women? Another example question is whether certain elements of the media instance, such as loud noises, were very effective at engaging viewers in a positive, challenging way? Yet another example question is whether thought provoking elements in the media instance were much more engaging to viewers than product shots? Also, an example question includes whether certain characters, such as lead female characters, appearing in the media instance were effective for male viewers and/or across target audiences in the female demographic? Still another example question includes whether physiological responses to the media instance from the viewers were consistent with viewers identifying or associating positively with the characters in the media instance? A further question is whether the media instance was universal—performed well at connecting across gender, age, and income boundaries, or highly polarizing?

The analysis module therefore automates the analysis through use of one or more questions, as described above. The questions provide a context for analyzing and presenting the data or information received from viewers in response to the media instance. The analysis module is configured, using the received data, to answer some number of questions, where answers to the questions provide or correspond to the collected data. When a user desires results from the data for a particular media instance, the user selects a question to which they desire an answer for the media instance. In response to the question selection, the results of the analysis are presented in the form of an answer to the question, where the answer is derived or generated using the data collected and corresponding to the media instance. The results of the analysis can be presented using textual and/or graphical outputs or presentations. The results of the analysis can also be generated and presented using previous knowledge of how to represent the data to answer the question, the previous knowledge coming from similar data analyzed in the past. Furthermore, presentation of data of the media instance can be modified by the user through user or generation of other questions.

The analysis module performs the operations described above in conjunction with the presentation module, where the presentation module includes numerous different renderings for data. In operation, a rendering is specified or selected for a portion of data of a media instance, and the rendering is then tagged with one or more questions that apply to the data. This architecture allows users to modify how data is represented using a set of tools. The system remembers or stores information of how data was represented and the question or question type that was being answered. This information of prior system configurations allows the system, at a subsequent time, to self-configure to answer the same or similar questions for the same media instance or for different media instances. Users thus continually improve the ability of the system to answer questions and improve the quality of data provided in the answers.

Figure 10:
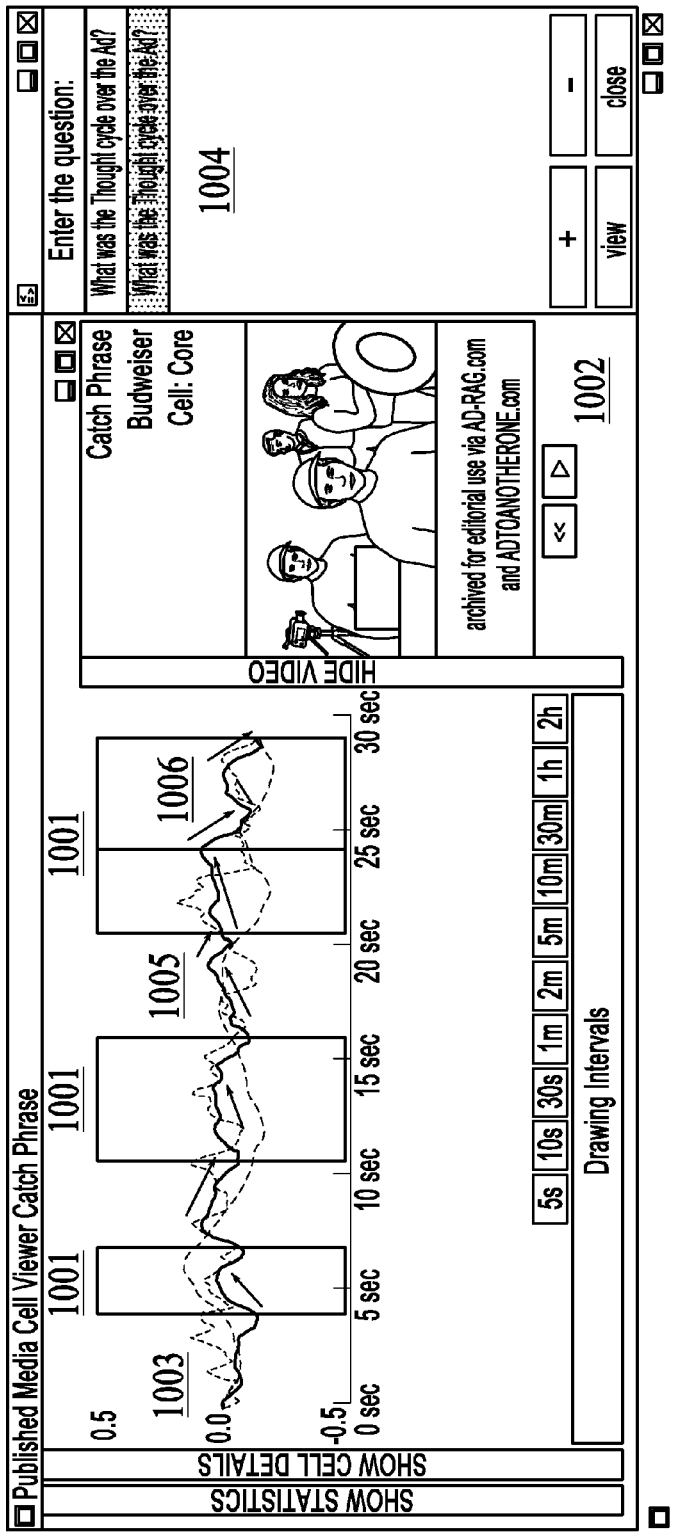
FIG. 10 shows exemplary highlights and arrows representing trends in the physiological responses from the viewers as well as verbal explanation of such markings.

In some embodiments, the presentation module is operable to enable the user to pick a certain section 1001 of the reactions to the media instance 1002, such as the physiological responses 1003 from the viewers shown in the reaction panel 1011 via, for a non-limiting example, "shading", as shown in FIG. 10. The analysis module 1006 may then perform the analysis requested on the shaded section of media instance and/or physiological responses automatically to illustrate the responses in a way that a lay person can take advantage of expert knowledge in parsing the viewers' reaction. The analyzed results can then be presented to the user in real time and can be shared with other people.

In some embodiments, the analysis module is operable to analyze the shaded section of the media instance and/or responses by being preprogrammed either by an analyst or the user themselves. Usually, a user is most often interested in a certain number of attributes of the viewers' responses. The analysis module provides the user with insights, conclusions, and findings that they can review from the bottom up. Although the analysis result provides inside and in-depth analysis of the data as well as various possible interpretations of the shaded section of the media instance, which often leaves a conclusion evident, such analysis, however, is no substitute for reaching conclusion by the user Instead the user is left to draw his/her own conclusion about the section based on the analysis provided.

In some embodiments, a user may pick a section and choose one of the questions/tasks/requests 1004 that he/she is interested in from a prepared list. The prepared list of questions may include but is not limited to any number of questions. Some example questions follow along with a response evoked in the analysis module.

An example question is "Where were there intense responses to the media instance?" In response the analysis module may calculate the intensity of the responses automatically by looking for high coherence areas of responses.

Another example question is "Does the media instance end on a happy note?" or "Does the audience think the event (e.g., joke) is funny?" In response the analysis module may check if the physiological data shows that viewer acceptance or approval is higher in the end than at the beginning of the media instance.

Yet another example question is "Where do people engage in the spot?" In response to this question the analysis module may check if there is a coherent change in viewers' emotions.

Still another example question is "What is the response to the brand moment?" In response the analysis module may check if thought goes up, but acceptance or approval goes down during the shaded section of the media.

An additional example question is "Which audience does the product introduction work on best?" In response the analysis module analyzes the responses from various segments of the viewers, which include but are not limited to, males, females, gamers, republicans, engagement relative to an industry, etc.

In some embodiments, the presentation module (FIG. 8, 807) is operable to present the analysis results in response to the questions raised together with the viewers' reactions to the user graphically on the interactive browser. For non-limiting examples, line highlights 1005 and arrows 1006 representing trends in the physiological responses from the viewers can be utilized as shown in FIG. 10, where highlights mark one or more specific physiological responses (e.g., thought in FIG. 10) to be analyzed and the up/down arrows indicate rise/fall in the corresponding responses. In addition, other graphic markings can also be used, which can be but are not limited to, text boxes, viewing data from multiple groups at once (comparing men to women) and any graphic tools that are commonly used to mark anything important. For another non-limiting example, a star, dot and/or other graphic element may be used to mark the point where there is the first coherent change and a circle may be used to mark the one with the strongest response.

In some embodiments, verbal explanation 1007 of the analysis results in response to the questions raised can be provided to the user together with graphical markings shown in FIG. 10. Such verbal explanation describes the graphical markings (e.g., why an arrow rises, details about the arrow, etc.). For the non-limiting example of an advertisement video clip shown in FIG. 10, verbal explanation 1007 states that "Thought follows a very regular sinusoidal pattern throughout this advertisement. This is often a result of tension-resolution cycles that are used to engage viewers by putting them in situations where they are forced to think intensely about what they are seeing and then rewarding them with the resolution of the situation." For another non-limiting example of a joke about a man hit by a thrown rock, the verbal explanation may resemble something like: "The falling of the man after being hit by a rock creates the initial coherent, positive response in liking. This shows that the actual rock throw is not funny, but the arc that the person's body takes is. After the body hits the ground, the response reverts to neutral and there are no further changes in emotions during this section."

In some embodiments, with reference to FIG. 8, an optional authentication module 813 is operable to authenticate identity of the user requesting access to the media instance and the verbatim reactions remotely over a network 812. Here, the network can be but is not limited to, internet, intranet, wide area network (WAN), local area network (LAN), wireless network, Bluetooth, and mobile communication network.

In some embodiments, optional user database 814 stores information of users who are allowed to access the media instances and the verbatim reactions from the viewers, and the specific media instances and the reactions each user is allowed to access. The access module 810 may add or remove a user for access, and limit or expand the list of media instances and/or reactions the user can access and/or the analysis features the user can use by checking the user's login name and password. Such authorization/limitation on a user's access can be determined to based upon who the user is, e.g., different amounts of information for different types of users. For a non-limiting example, Company ABC can have access to certain ads and feedbacks from viewers' reactions to the ads, to which Company XYZ can not have access or can have only limited access.

An embodiment synchronizes a specific media instance with physiological responses to the media instance from a plurality of viewers continuously over the entire time duration of the media instance. Once the media instance and the physiological responses are synchronized, an interactive browser enables a user to navigate through the media instance (or the physiological responses) in one panel while presenting the corresponding physiological responses (or the section of the media instance) at the same point in time in another panel.

The interactive browser allows the user to select a section/scene from the media instance, correlate, present, and compare the viewers' physiological responses to the particular section. Alternatively, the user may monitor the viewers' physiological responses continuously as the media instance is being displayed. Being able to see the continuous (instead of static snapshot of) changes in physiological responses and the media instance side by side and compare aggregated physiological responses from the viewers to a specific event of the media instance in an interactive way enables the user to obtain better understanding of the true reaction from the viewers to whatever stimuli being presented to them.

Figure 11:
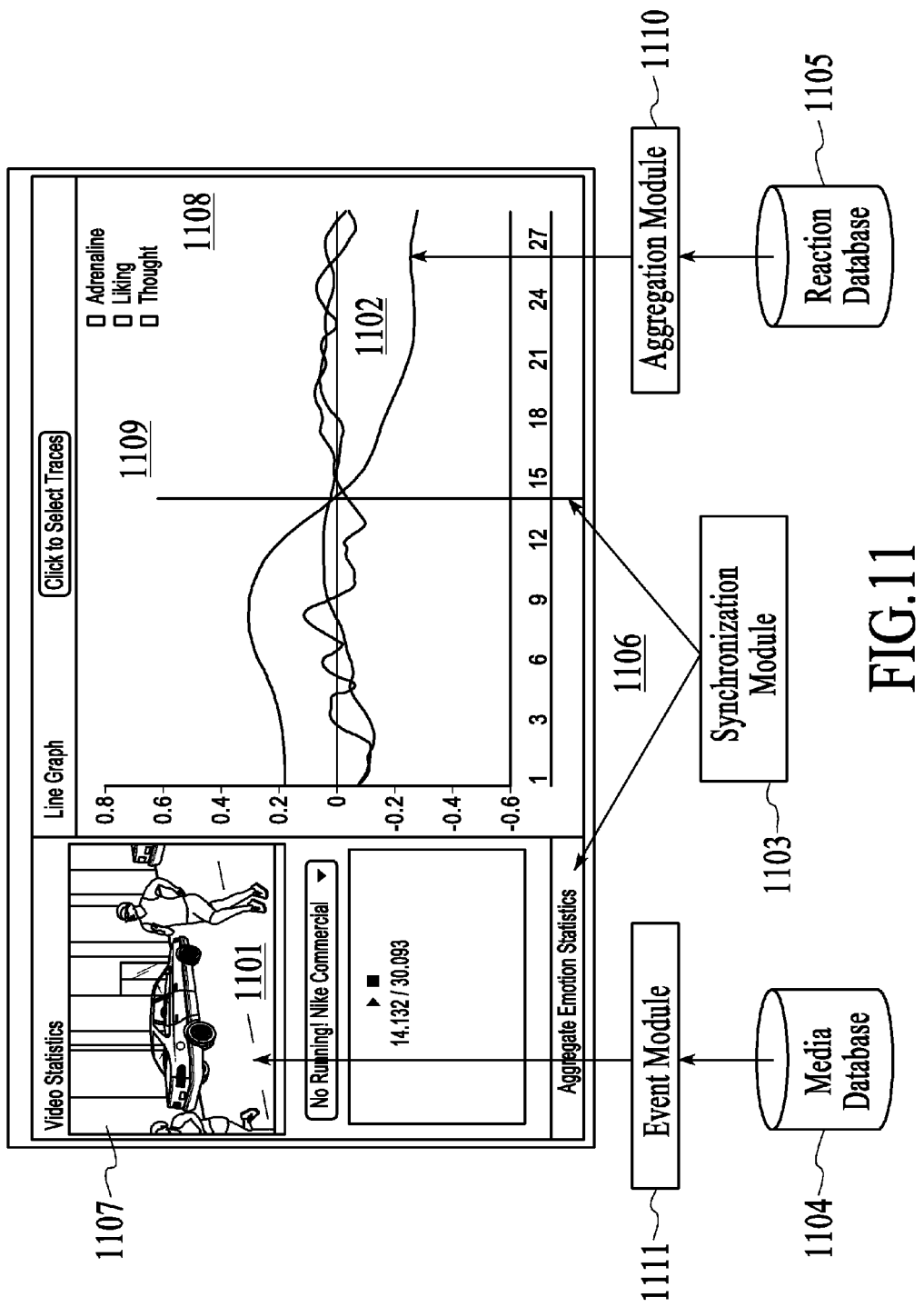
FIG. 11 is an illustration of an exemplary system to support synchronization of media with physiological responses from viewers.

FIG. 11 is an illustration of an exemplary system to support synchronization of media with physiological responses from viewers of the media. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 11, a synchronization module 1103 is operable to synchronize and correlate a media instance 1101 with one or more physiological responses 1102 aggregated from one or more viewers of the media instance continuously at each and every moment over the entire duration of the media instance. Here, the media instance and its pertinent data can be stored in a media database 1104, and the one or more physiological responses aggregated from the viewers can be stored in a reaction database 1105, respectively. An interactive browser 1106 comprises at least two panels including a media panel 1107, which is operable to present, play, and pause the media instance, and a reaction panel 1108, which is operable to display and compare the one or more physiological responses (e.g., Adrenaline, Liking, and Thought) corresponding to the media instance as lines (traces) in a two-dimensional line graph. A horizontal axis of the graph represents time, and a vertical axis represents the amplitude (intensity) of the one or more physiological responses. A cutting line 1109 marks the physiological responses from the viewers to the current scene (event, section, or moment in time) of the media instance, wherein the cutting line can be chosen by the user and move in coordination with the media instance being played. The interactive browser enables the user to select an event/section/scene/moment from the media instance presented in the media panel 1107 and correlate, present, and compare the viewers' physiological responses to the particular section in the reaction panel 1108. Conversely, interactive browser also enables the user to select the cutting line 1109 of physiological responses from the viewers in the reaction panel 1108 at any specific moment, and the corresponding media section or scene can be identified and presented in the media panel 1107.

The synchronization module 1103 of an embodiment synchronizes and correlates a media instance 1101 with one or more physiological responses 1102 aggregated from a plurality of viewers of the media instance by synchronizing each event of the media. The physiological response data of a person includes but is not limited to heart rate, brain waves, electroencephalogram (EEG) signals, blink rate, breathing, motion, muscle movement, galvanic skin response, skin temperature, and any other physiological response of the person. The physiological response data corresponding to each event or point in time is then retrieved from the media database 1104. The data is offset to account for cognitive delays in the human brain corresponding to the signal collected (e.g., the cognitive delay of the brain associated with human vision is different than the cognitive delay associated with auditory information) and processing delays of the system, and then synchronized with the media instance 1101. Optionally, an additional offset may be applied to the physiological response data 1102 of each individual to account for time zone differences between the view and reaction database 1105.

Figure 12:
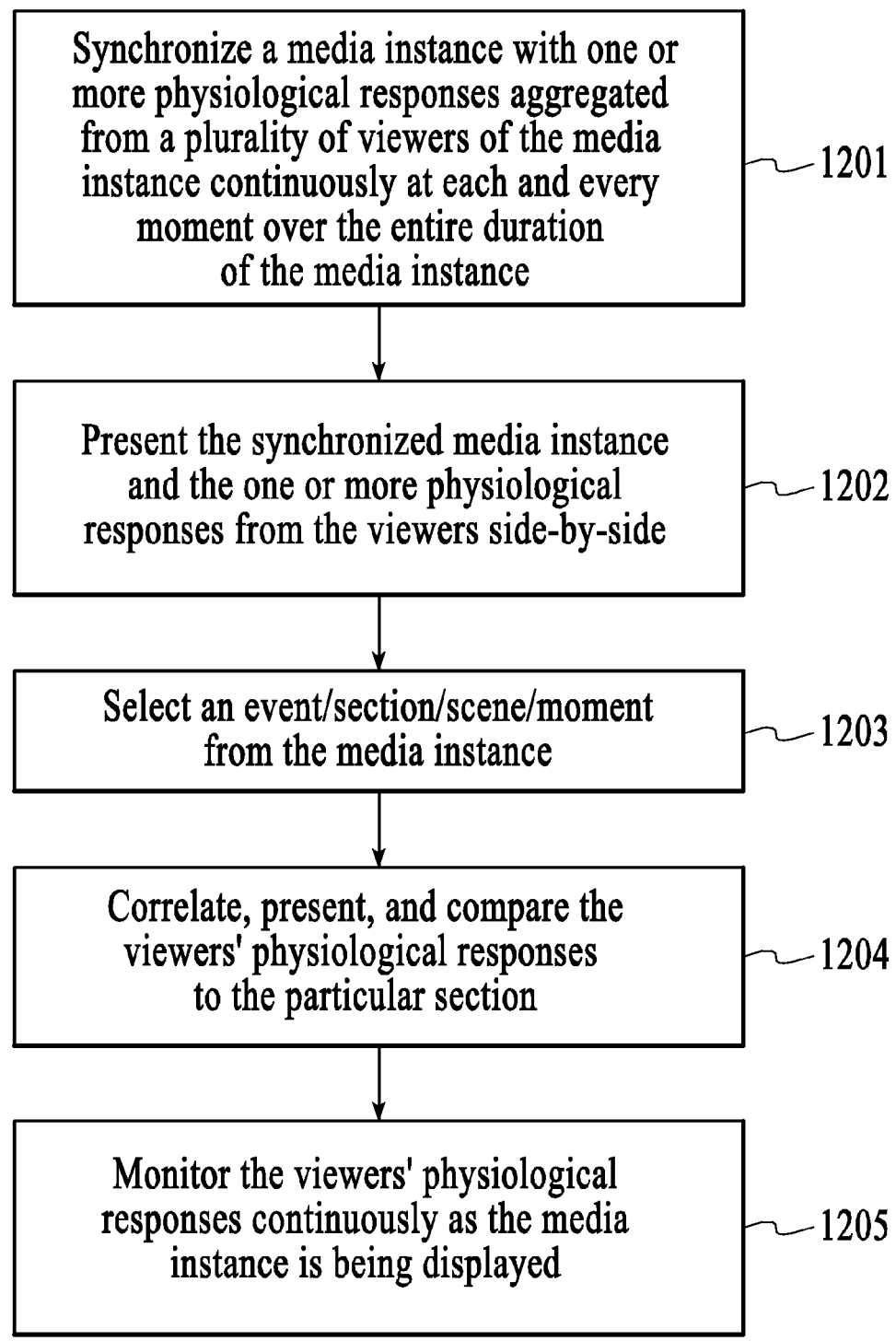
FIG. 12 is a flow chart illustrating an exemplary process to support synchronization of media with physiological responses from viewers.

FIG. 12 is a flow chart illustrating an exemplary process to support synchronization of media with physiological responses from viewers of the media. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 12, a media instance is synchronized with one or more physiological responses aggregated from a plurality of viewers of the media instance continuously at each and every moment over the entire duration of the media instance at step 1201. At step 1202, the synchronized media instance and the one or more physiological responses from the viewers are presented side-by-side. An event/section/scene/moment from the media instance can be selected at step 1203, and the viewers' physiological responses to the particular section can be correlated, presented, and compared at step 1204. Alternatively, the viewers' physiological responses can be monitored continuously as the media instance is being displayed at step 1205.

In some embodiments, with reference to FIG. 11, an aggregation module 1110 is operable to retrieve from the reaction database 1105 and aggregate the physiological responses to the media instance across the plurality of viewers and present each of the aggregated responses as a function over the duration of the media instance. The aggregated responses to the media instance can be calculated via one or more of: max, min, average, deviation, or a higher ordered approximation of the intensity of the physiological responses from the viewers.

In some embodiments, change (trend) in amplitude of the aggregated responses is a good measure of the quality of the media instance. If the media instance is able to change viewers emotions up and down in a strong manner (for a non-limiting example, mathematical deviation of the response is large), such strong change in amplitude corresponds to a good media instance that puts the viewers into different emotional states. In contrast, a poor performing media instance does not put the viewers into different emotional states. Such information can be used by media designers to identify if the media instance is eliciting the desired response and which key events/scenes/sections of the media instance need to be changed in order to match the desired response. A good media instance should contain multiple moments/scenes/events that are intense and produce positive amplitude of response across viewers. A media instance failed to create such responses may not achieve what the creators of the media instance have intended.

In some embodiments, the media instance can be divided up into instances of key moments/events/scenes/segments/ sections in the profile, wherein such key events can be identified and/tagged according to the type of the media instance. In the case of video games, such key events include but are not limited to, elements of a video game such as levels, cut scenes, major fights, battles, conversations, etc. In the case of Web sites, such key events include but are not limited to, progression of Web pages, key parts of a Web page, advertisements shown, content, textual content, video, animations, etc. In the case of an interactive media/movie/ads, such key events can be but are not limited to, chapters, scenes, scene types, character actions, events (for non-limiting examples, car chases, explosions, kisses, deaths, jokes) and key characters in the movie.

In some embodiments, an event module 1111 can be used to quickly identify a numbers of moments/events/scenes/segments/sections in the media instance retrieved from the media database 1104 and then automatically calculate the length of each event. The event module may enable each user, or a trained administrator, to identify and tag the important events in the media instance so that, once the "location" (current event) in the media instance (relative to other pertinent events in the media instance) is selected by the user, the selected event may be better correlated with the aggregated responses from the viewers.

In some embodiments, the events in the media instance can be identified, automatically if possible, through one or more applications that parse user actions in an environment (e.g., virtual environment, real environment, online environment, etc.) either before the viewer's interaction with the media instance in the case of non-interactive media such as a movie, or afterwards by reviewing the viewer's interaction with the media instance through recorded video, a log of actions or other means. In video games, web sites and other electronic interactive media instance, the program that administers the media can create this log and thus automate the process.

An embodiment enables graphical presentation and analysis of verbatim comments and feedbacks from a plurality of viewers to a specific media instance. These verbatim comments are first collected from the viewers and stored in a database before being analyzed and categorized into various categories. Once categorized, the comments can then be presented to a user in various graphical formats, allowing the user to obtain an intuitive visual impression of the positive/negative reactions to and/or the most impressive characteristics of the specific media instance as perceived by the viewers.

An embodiment enables graphical presentation and analysis of verbatim comments and feedbacks from a plurality of viewers to a specific media instance. These verbatim comments are first collected from the viewers and stored in a database before being analyzed and categorized into various categories. Once categorized, the comments can then be presented to a user in various graphical formats, allowing the user to obtain an intuitive visual impression of the positive/negative reactions to and/or the most impressive characteristics of the specific media instance, as perceived by the viewers. Instead of parsing through and dissecting the comments and feedbacks word by word, the user is now able to visually evaluate how well the media instance is being received by the viewers at a glance.

Figure 13:
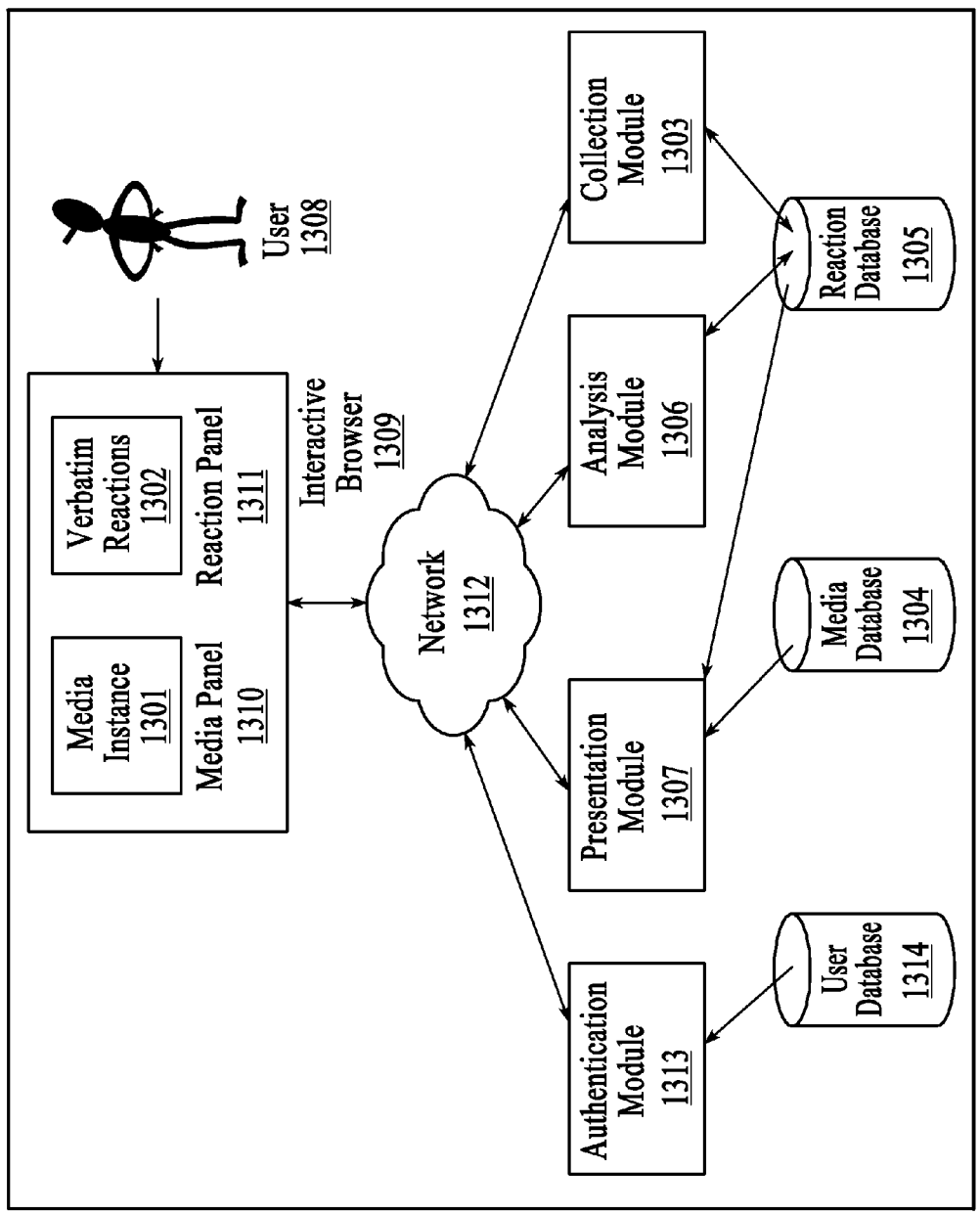
FIG. 13 is an illustration of an exemplary system to support graphical presentation of verbatim comments from viewers.

FIG. 13 is an illustration of an exemplary system to support graphical presentation of verbatim comments from viewers. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 13, a collection module 1303 is operable to collect, record, store and manage verbatim reactions 1302 (comments and feedbacks) from a plurality of viewers of a media instance 1301. Here, the media instance and its pertinent data can be stored in a media database 1304, and the verbatim reactions from the viewers can be stored in a reaction database 1305, respectively. An analysis module 1306 is operable to analyze the verbatim comments from the viewers and categorize them into the plurality of categories. A presentation module 1307 is operable to retrieve and categorize the verbatim reactions to the media instance into various categories, and then present these verbatim reactions to a user 1308 based on their categories in graphical forms via an interactive browser 1309. The interactive browser includes at least two panels—a media panel 1310, which is operable to present, play, and pause the media instance, and a comments panel 1311, which is operable to display not only the one or more reactions corresponding to the media instance, but also one or more graphical categorization and presentation of the verbatim reactions to provide the user with both a verbal and/or a visual perception and interpretation of the feedbacks from the viewers.

Figure 14:
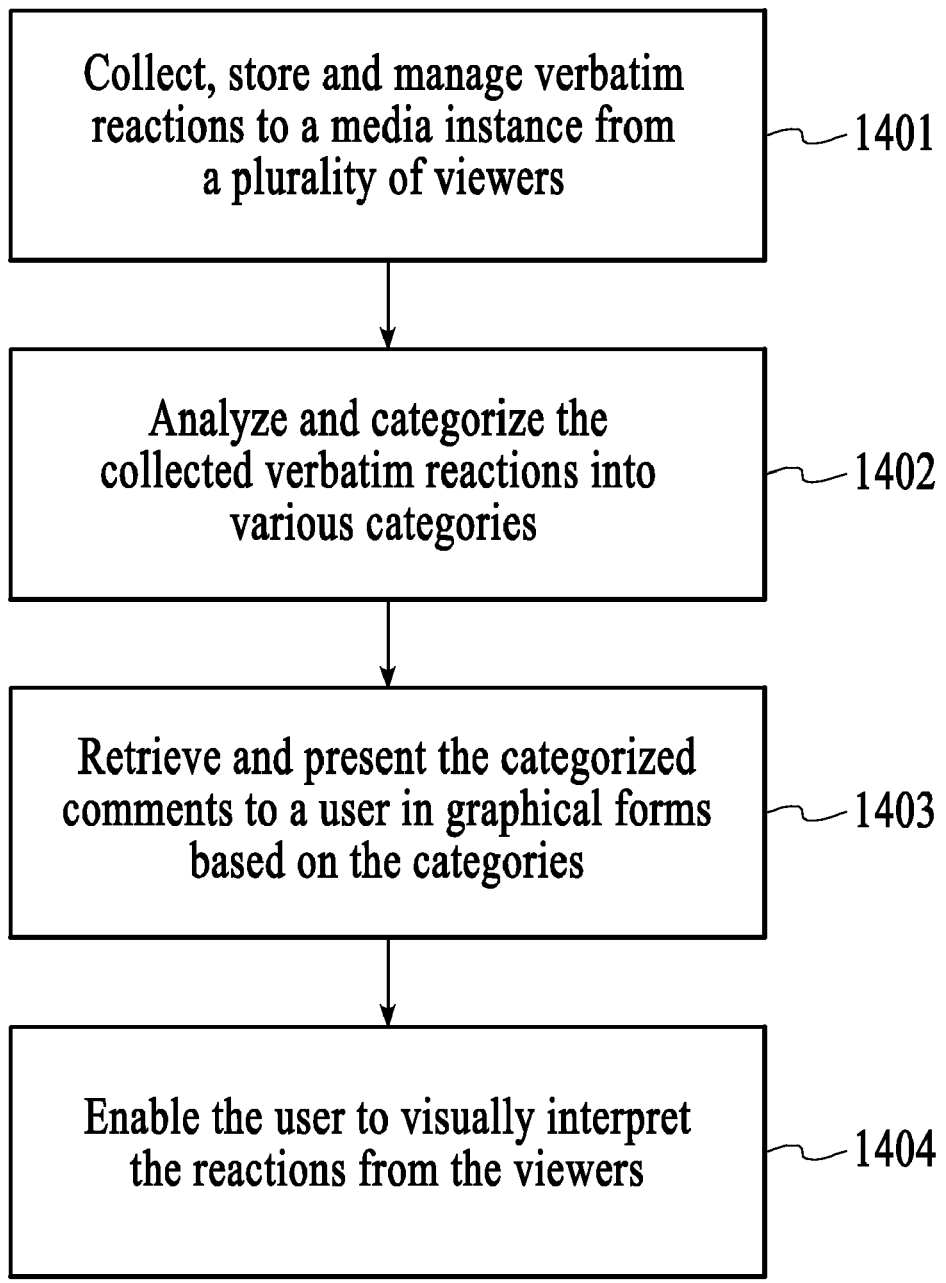
FIG. 14 is a flow chart illustrating an exemplary process to support graphical presentation of verbatim comments from viewers.

FIG. 14 is a flow chart illustrating an exemplary process to support graphical presentation of verbatim comments from viewers. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 14, verbatim reactions to a media instance from a plurality of viewers are collected, stored and managed at step 1401. At step 1402, the collected verbatim reactions are analyzed and categorized into various categories. The categorized comments are then retrieved and presented to a user in graphical forms based on the categories at step 1403, enabling the user to visually interpret the reactions from the viewers at step 1404.

In some embodiments, the viewers of the media instance are free to write what they like and don't like about the media instance, and the verbatim (free flowing text) comments or feedbacks 501 from the viewers can be recorded and presented in the comments panel 111 verbatim as shown in FIG. 4 described above. In some embodiments, the analysis module is operable to further characterize the comments in each of the plurality of categories are as positive or negative based on the words used in each of the comments. Once characterized, the number of positive or negative comments in each of the categories can be summed up. For a non-limiting example, comments from viewers on a certain type of events, like combat, can be characterized and summed up as being 40% positive, while 60% negative. Such an approach avoids single verbatim response from bias the responses from a group of viewers, making it easy for the user to understand how viewers would react to every aspect of the media instance.

In some embodiments, the analysis module is operable to characterize the viewers' comments about the media instance as positive or negative in a plurality of categories/topics/aspects related to the product, wherein such categories include but are not limited to, product, event, logo, song, spokesperson, jokes, narrative, key events, storyline. These categories may not be predetermined, but instead be extracted from the analysis of their comments.

Figure 15:
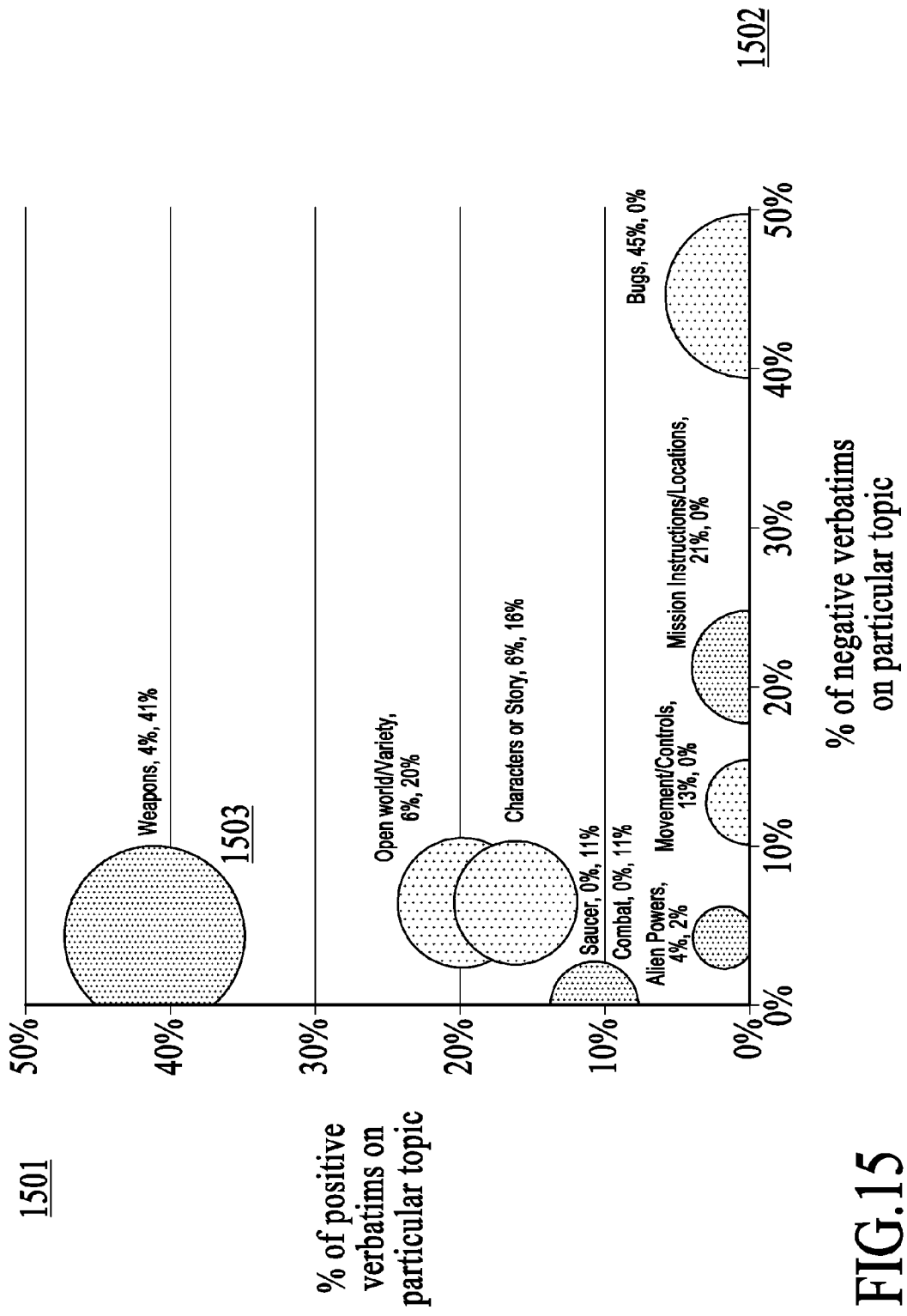
FIG. 15 shows an exemplary bubble graph presenting summation of positive and negative comments from the viewers to various aspects of the media instance.

In some embodiments, the presentation module is operable to present summation of the viewers' positive and negative comments to various aspects/topics/events of the media instance to the user (creator of the media instance) in a bubble graph, as shown in FIG. 15. The vertical axis 1501 and horizontal axis 1502 of the bubble graph represent the percentage of positive or negative comments from the viewers about the media instance, respectively. Each bubble 1503 in the graph represents one of the topics the viewers have commented upon, marked by the name of the event and the percentages of the viewers' negative and positive feedbacks on the event. The size of the bubble represents the number of viewers commenting on this specific aspect of the media instance, and the location of the bubble on the graph indicates whether the comments from the viewers are predominantly positive or negative.

In some embodiments, the verbatim comments from the viewers can be analyzed, and key words and concepts (adjectives) can be extracted and presented in a word cloud, as shown in FIG. 16, rendering meaningful information from the verbatim comments more accessible. Every word in the word cloud is represented by a circle, square, any other commonly used geometric shape or simply by the word itself as shown in FIG. 16. Each representation is associated with a corresponding weight represented using font sizes or other visual clues. For the non-limiting example in FIG. 16, the size of each word in the word cloud represents the number of times or percentages of the viewers use the word in their responses. This is useful as a means of displaying "popularity" of an adjective that has been democratically 'voted' on to describe the media instance and where precise results are not desired. Here, the three most popular adjectives used to describe the media instance are "fun", "cool", and "boring".

In some embodiments, the viewers may simply be asked to answer a specific question, for example, "What are three adjectives that best describe your response to this media." The adjectives in the viewers' responses to the question can then be collected, categorized, and summed up, and presented in a Word cloud. Alternatively, the adjectives the viewers used to describe their responses to the media instance may be extracted from collected survey data.

In some embodiments, with reference to FIG. 13, an optional authentication module 1313 is operable to authenticate identity of the user requesting access to the media instance and the verbatim reactions remotely over a network 1313. Here, the network can be but is not limited to, internet, intranet, wide area network (WAN), local area network (LAN), wireless network, Bluetooth, and mobile communication network.

In some embodiments, optional user database 1314 stores information of users who are allowed to access the media instances and the verbatim reactions from the viewers, and the specific media instances and the reactions each user is allowed to access. The access module 1310 may add or remove a user for access, and limit or expand the list of media instances and/or reactions the user can access and/or the analysis features the user can use by checking the user's login name and password. Such authorization/limitation on a user's access can be determined to based upon who the user is, e.g., different amounts of information for different types of users. For a non-limiting example, Company ABC can have access to certain ads and feedback from viewers' reactions to the ads, while Company XYZ can not have access or can only have limited access to the same ads and/or feedback.

Embodiments described herein include a method comprising: receiving a media instance, the media instance including a plurality of media events; receiving reaction data from a plurality of viewers while the plurality of viewers are viewing the media instance; generating aggregated reaction data by aggregating the reaction data from the plurality of viewers; generating synchronized data by synchronizing the plurality of media events of the media instance with corresponding aggregated reaction data; and providing controlled access to the synchronized data from a remote device.

The method of an embodiment comprises providing, via the controlled access, remote interactive manipulation of the reaction data synchronized to corresponding events of the media instance.

The manipulation of an embodiment includes at least one of dividing, dissecting, aggregating, parsing, organizing, and analyzing the reaction data.

The method of an embodiment comprises providing controlled access to at least one of the reaction data and aggregated reaction data.

The method of an embodiment comprises enabling via the controlled access interactive analysis of at least one of the media instance and the synchronized data.

The method of an embodiment comprises enabling via the controlled access interactive analysis of at least one of the reaction data, the aggregated reaction data, and parsed reaction data.

The reaction data of an embodiment includes at least one of physiological responses, survey results, feedback generated by the viewers, metadata, and derived statistics.

The reaction data of an embodiment includes physiological responses.

The reaction data of an embodiment includes survey results.

The reaction data of an embodiment includes feedback generated by the viewers.

The reaction data of an embodiment includes metadata, wherein the metadata is event-based metadata.

The reaction data of an embodiment includes derived statistics, wherein the derived statistics are derived statistics for indicators of success and failure of the media instance Receiving the reaction data of an embodiment comprises receiving the reaction data from a plurality of sensor devices via a wireless couplings, wherein each viewer wears a sensor device of the plurality of sensor devices.

The method of an embodiment comprises presenting a user interface (UI), wherein the controlled access is made via the UI.

The method of an embodiment comprises presenting the synchronized data using a rendering of a plurality or renderings.

The plurality of renderings of an embodiment includes text, charts, graphs, histograms, images, and video.

The aggregating of an embodiment comprises aggregating the reaction data according to at least one of maximums, minimums, averages, deviations, derivatives, amplitudes, and trends of at least one parameter of the reaction data.

The method of an embodiment comprises selecting, via the controlled access, a portion of the media instance for which at least one of the synchronized data, the reaction data, the aggregated reaction data, and parsed reaction data is viewed. The portion of an embodiment includes a point in time. The portion of an embodiment includes a period of time.

The method of an embodiment comprises automatically analyzing the reaction data.

The method of an embodiment comprises providing remote access to results of the analyzing, and presenting the results, the presenting including presenting actionable insights corresponding to a portion of the media instance via at least one of a plurality of renderings, wherein the actionable insights correspond to emotional reactions of the plurality of viewers.

The analyzing of an embodiment includes applying expert knowledge of physiological behavior to the reaction data.

The method of an embodiment comprises generating a first set of questions that represent the results.

The analyzing of an embodiment includes analyzing the reaction data in the context of the first set of questions.

The method of an embodiment comprises selecting at least one rendering of the plurality of renderings.

The method of an embodiment comprises tagging the selected rendering with at least one question of the first set of questions.

A user of an embodiment can modify the presenting of the results via the selecting of at least one rendering of the plurality of renderings.

The presenting of an embodiment includes presenting the results via presentation of the first set of questions.

The method of an embodiment comprises, in response to the user selecting a question of the first set of questions, presenting an answer to the selected question that includes the actionable insight.

The method of an embodiment comprises receiving comments from the plurality of viewers in response to the viewing. The comments of an embodiment are textual comments. The synchronized data of an embodiment includes the comments.

The method of an embodiment comprises presenting survey questions to the plurality of viewers, the survey questions relating to the media instance. The method of an embodiment comprises receiving answers to the survey questions from the plurality of viewers. The answers to the survey questions of an embodiment are textual comments. The synchronized data of an embodiment includes the answers to the survey questions.

The plurality of viewers of an embodiment is at a location.

The plurality of viewers of an embodiment is at a plurality of locations.

A first set of the plurality of viewers of an embodiment is at a first location and a second set of the plurality of viewers is at a second location different from the first location.

A first set of the plurality of viewers of an embodiment is viewing the media instance at a first time and a second set of the plurality of viewers is viewing the media instance at a second time different from the first time.

The reaction data of an embodiment corresponds to electrical activity in brain tissue of the user.

The reaction data of an embodiment corresponds to electrical activity in muscle tissue of the user.

The reaction data of an embodiment corresponds to electrical activity in heart tissue of the user.

Embodiments described herein include a method comprising: receiving a media instance; receiving reaction data from a plurality of viewers, the reaction data generated in response to viewing of the media instance and including physiological response data; aggregating the reaction data from the plurality of viewers; and providing remote access to at least one of the reaction data and aggregated reaction data, wherein the remote access enables interactive analysis of at least one of the media instance, the reaction data, aggregated reaction data, and parsed reaction data.

Embodiments described herein include a method comprising: receiving a media instance; receiving reaction data from a plurality of viewers, the reaction data generated in response to viewing of the media instance and including physiological response data; aggregating the reaction data from the plurality of viewers; and enabling remote interactive analysis of the media instance and at least one of the reaction data, aggregated reaction data, and parsed reaction data.

Embodiments described herein include a method comprising: receiving a media instance; receiving reaction data from a plurality of viewers, the reaction data generated in response to viewing of the media instance and including physiological response data; and enabling remote interactive manipulation of the reaction data synchronized to corresponding events of the media instance, the manipulation including at least one of dividing, dissecting, aggregating, parsing, and analyzing the reaction data.

Embodiments described herein include a system comprising: a processor coupled to a database, the database including a media instance and reaction data, the media instance comprising a plurality of media events, the reaction data received from a plurality of viewers viewing the media instance; a first module coupled to the processor, the first module generating aggregated reaction data by aggregating the reaction data from the plurality of viewers, the first module generating synchronized data by synchronizing the plurality of media events of the media instance with corresponding aggregated reaction data; and a second module coupled to the processor, the second module comprising a plurality of renderings and a user interface (UI) that provide controlled access to the synchronized data from a remote device.

The controlled access of an embodiment is through the UI and includes remote interactive manipulation of the reaction data synchronized to corresponding events of the media instance.

The manipulation of an embodiment includes at least one of dividing, dissecting, aggregating, parsing, organizing, and analyzing the reaction data.

The controlled access of an embodiment includes access to at least one of the reaction data and aggregated reaction data.

The controlled access of an embodiment includes interactive analysis of at least one of the media instance and the synchronized data.

The controlled access of an embodiment includes interactive analysis of at least one of the reaction data, the aggregated reaction data, and parsed reaction data.

The plurality of renderings of an embodiment includes text, charts, graphs, histograms, images, and video.

The UI of an embodiment presents the synchronized data using at least one rendering of the plurality or renderings.

The UI of an embodiment allows selection of a portion of the media instance for which at least one of the synchronized data, the reaction data, the aggregated reaction data, and parsed reaction data is viewed. The portion of an embodiment includes a point in time. The portion of an embodiment includes a period of time.

The first module of an embodiment analyzes the reaction data.

The UI of an embodiment provides remote access to results of the analysis.

The UI of an embodiment presents the results using at least one rendering of the plurality of renderings, the results including actionable insights corresponding to a portion of the media instance.

The actionable insights of an embodiment correspond to emotional reactions of the plurality of viewers.

The analyzing of an embodiment comprises applying expert knowledge of physiological behavior to the reaction data.

The system of an embodiment comprises generating a first set of questions that represent the results.

The analyzing of an embodiment includes analyzing the reaction data in the context of the first set of questions.

The system of an embodiment comprises selecting at least one rendering of the plurality of renderings.

The system of an embodiment comprises tagging the selected rendering with at least one question of the first set of questions.

A user of an embodiment can modify presentation of the results via the UI by selecting at least one rendering of the plurality of renderings.

The presenting of an embodiment includes presenting the results via presentation of the first set of questions on the UI.

The system of an embodiment comprises, in response to the user selecting a question of the first set of questions, presenting via the UI an answer to the selected question that includes the actionable insight.

The reaction data of an embodiment includes at least one of physiological responses, survey results, feedback generated by the viewers, metadata, and derived statistics.

The reaction data of an embodiment includes physiological responses.

The reaction data of an embodiment includes survey results.

The reaction data of an embodiment includes feedback generated by the viewers.

The reaction data of an embodiment includes metadata. The metadata of an embodiment is event-based metadata.

The reaction data of an embodiment includes derived statistics. The derived statistics of an embodiment are derived statistics for indicators of success and failure of the media instance.

The system of an embodiment comprises a plurality of sensor devices, wherein each viewer wears a sensor device of the plurality of sensor devices, wherein each sensor device receives the reaction data from a corresponding view and transmits the reaction data to at least one of the first module and the database.

The aggregating of an embodiment comprises aggregating the reaction data according to at least one of maximums, minimums, averages, deviations, derivatives, amplitudes, and trends of at least one parameter of the reaction data.

The system of an embodiment comprises a third module coupled to the second module, the third module receiving comments from the plurality of viewers in response to the viewing. The comments of an embodiment are textual comments. The synchronized data of an embodiment includes the comments.

The system of an embodiment comprises a third module coupled to the second module, the third module presenting survey questions to the plurality of viewers via the UI, the survey questions relating to the media instance.

The third module of an embodiment receives answers to the survey questions from the plurality of viewers via the UI. The answers to the survey questions of an embodiment are textual comments. The synchronized data of an embodiment includes the answers to the survey questions.

The plurality of viewers of an embodiment is at a location.

The plurality of viewers of an embodiment is at a plurality of locations.

A first set of the plurality of viewers of an embodiment is at a first location and a second set of the plurality of viewers are at a second location different from the first location.

A first set of the plurality of viewers of an embodiment is viewing the media instance at a first time and a second set of the plurality of viewers are viewing the media instance at a second time different from the first time.

The reaction data of an embodiment corresponds to electrical activity in brain tissue of the user.

The reaction data of an embodiment corresponds to electrical activity in muscle tissue of the user.

The reaction data of an embodiment corresponds to electrical activity in heart tissue of the user.

Embodiments described herein include a system comprising: a processor coupled to a database, the database including a media instance and reaction data of a plurality of viewers, the reaction data generated in response to viewing of the media instance and including physiological response data; a first module that aggregates the reaction data from the plurality of viewers; and a second module that provides remote access to at least one of the reaction data and aggregated reaction data, wherein the remote access enables interactive analysis of at least one of the media instance, the reaction data, aggregated reaction data, and parsed reaction data.

Embodiments described herein include a system comprising: a processor coupled to a database, the database receiving a media instance and reaction data from a plurality of viewers, the reaction data generated in response to viewing of the media instance and including physiological response data; a first module aggregating the reaction data from the plurality of viewers; and a second module enabling remote interactive analysis and presentation of the media instance and at least one of the reaction data, aggregated reaction data, and parsed reaction data.

Embodiments described herein include a system comprising: a processor coupled to a database, the database receiving a media instance and reaction data from a plurality of viewers, the reaction data generated in response to viewing of the media instance and including physiological response data; and an interface coupled to the processor, the interface enabling remote interactive manipulation of the reaction data synchronized to corresponding events of the media instance, the manipulation including at least one of dividing, dissecting, aggregating, parsing, and analyzing the reaction data.

Embodiments described herein include a method comprising: receiving a media instance, the media instance including a plurality of media events; receiving reaction data from a plurality of viewers while the plurality of viewers are viewing the media instance; automatically analyzing the reaction data; and providing remote access to results of the analyzing, and presenting the results, the presenting including presenting actionable insights corresponding to a portion of the media instance via at least one of a plurality of renderings, wherein the actionable insights correspond to emotional reactions of the plurality of viewers.

The analyzing of an embodiment includes applying expert knowledge of physiological behavior to the reaction data.

The method of an embodiment comprises generating a first set of questions that represent the results.

The analyzing of an embodiment includes analyzing the reaction data in the context of the first set of questions.

The method of an embodiment comprises selecting at least one rendering of the plurality of renderings.

The method of an embodiment comprises tagging the selected rendering with at least one question of the first set of questions.

A user of an embodiment can modify the presenting of the results via the selecting of at least one rendering of the plurality of renderings.

The presenting of an embodiment includes presenting the results via presentation of the first set of questions.

The method of an embodiment comprises, in response to the user selecting a question of the first set of questions, presenting an answer to the selected question that includes the actionable insight.

The method of an embodiment comprises selecting a second set of questions that represent the results, wherein the second set of questions were generated prior to the first set of questions to represent previous results from analysis of preceding reaction data of a preceding media instance, wherein the preceding reaction data is similar to the reaction data.

The analyzing of an embodiment includes analyzing the reaction data in the context of the second set of questions.

The method of an embodiment comprises selecting at least one rendering of the plurality of renderings.

The method of an embodiment comprises tagging the selected rendering with at least one question of the second set of questions.

A user of an embodiment can modify the presenting of the results via the selecting of at least one rendering of the plurality of renderings.

The presenting of an embodiment includes presenting the results via presentation of the second set of questions.

The method of an embodiment comprises, in response to the user selecting a question of the second set of questions, presenting an answer to the selected question that includes the actionable insight.

The method of an embodiment comprises selecting a set of the reaction data to which the analyzing is applied, the selecting including selecting a portion of the media instance to which the set of the reaction data corresponds. The portion of an embodiment includes a point in time. The portion of an embodiment includes a period of time.

The method of an embodiment comprises generating aggregated reaction data by aggregating the reaction data from the plurality of viewers.

The aggregating of an embodiment comprises aggregating the reaction data according to at least one of maximums, minimums, averages, deviations, derivatives, amplitudes, and trends of at least one parameter of the reaction data.

The method of an embodiment comprises generating synchronized data by synchronizing the plurality of media events of the media instance with the reaction data.

The method of an embodiment comprises enabling remote interactive manipulation of the media instance.

The method of an embodiment comprises enabling remote interactive manipulation of the reaction data.

The method of an embodiment comprises enabling remote interactive manipulation of the plurality of renderings.

The method of an embodiment comprises enabling remote interactive manipulation of the actionable insights.

The plurality of renderings of an embodiment includes text, charts, graphs, histograms, images, and video.

The reaction data of an embodiment includes at least one of physiological responses, survey results, feedback generated by the viewers, metadata, and derived statistics The reaction data of an embodiment includes physiological responses The reaction data of an embodiment includes survey results.

The reaction data of an embodiment includes feedback generated by the viewers

The reaction data of an embodiment includes metadata, wherein the metadata is event-based metadata.

The reaction data of an embodiment includes derived statistics, wherein the derived statistics are derived statistics for indicators of success and failure of the media instance.

Receiving the reaction data of an embodiment comprises receiving the reaction data from a plurality of sensor devices via a wireless couplings, wherein each viewer wears a sensor device of the plurality of sensor devices.

The reaction data of an embodiment corresponds to electrical activity in brain tissue of the user.

The reaction data of an embodiment corresponds to electrical activity in muscle tissue of the user.

The reaction data of an embodiment corresponds to electrical activity in heart tissue of the user.

A first set of the plurality of viewers of an embodiment is at a first location and a second set of the plurality of viewers is at a second location different from the first location A first set of the plurality of viewers of an embodiment is viewing the media instance at a first time and a second set of the plurality of viewers is viewing the media instance at a second time different from the first time.

Embodiments described herein include a method comprising: receiving a media instance; receiving reaction data from a plurality of viewers while the plurality of viewers are viewing the media instance; automatically analyzing the reaction data; and presenting the results by presenting actionable insights corresponding to a portion of the media instance via at least one of a plurality of renderings, wherein the actionable insights correspond to emotional reactions of the plurality of viewers.

Embodiments described herein include a method comprising: receiving a media instance; receiving reaction data from a plurality of viewers viewing the media instance; analyzing the reaction data; and presenting results of the analyzing by presenting a set of questions corresponding to a portion of the media instance, the set of questions corresponding to at least one of a plurality of renderings, wherein answers to questions of the set of questions present actionable insights of the reaction data, the actionable insights corresponding to emotional reactions of the plurality of viewers.

Embodiments described herein include a system comprising: a processor coupled to a database, the database including a media instance and reaction data, the media instance including a plurality of media events, the reaction data received from a plurality of viewers while the plurality of viewers are viewing the media instance; a first module coupled to the processor, the first module analyzing the reaction data; and a second module coupled to the processor, the second module comprising a plurality of renderings and a user interface (UI) that provide remote access to results of the analyzing and the results, the results including actionable insights corresponding to a portion of the media instance, wherein the actionable insights correspond to emotional reactions of the plurality of viewers.

The analyzing of an embodiment includes applying expert knowledge of physiological behavior to the reaction data.

The first module of an embodiment generates a first set of questions that represent the results.

The analyzing of an embodiment includes analyzing the reaction data in the context of the first set of questions.

At least one of the second module and the UI of an embodiment enables selection of at least one rendering of the plurality of renderings.

At least one of the second module and the UI of an embodiment enables tagging of a selected rendering with at least one question of the first set of questions.

A user of an embodiment can modify presentation of the results via the UI by selecting at least one rendering of the plurality of renderings.

At least one of the second module and the UI of an embodiment presents the results via presentation of the first set of questions.

In response to receipt of a selected question of the first set of questions, the second module of an embodiment presents an answer to the selected question that includes the actionable insight.

The first module of an embodiment selects a second set of questions that represent the results, wherein the second set of questions were generated prior to the first set of questions to represent previous results from analysis of preceding reaction data of a preceding media instance, wherein the preceding reaction data is similar to the reaction data.

The analyzing of an embodiment includes analyzing the reaction data in the context of the second set of questions.

The UI of an embodiment enables selection of at least one rendering of the plurality of renderings.

The method of an embodiment comprises tagging the selected rendering with at least one question of the second set of questions.

A user of an embodiment can modify presentation of the results via the UI by the selecting of at least one rendering of the plurality of renderings.

At least one of the second module and the UI of an embodiment presents the results via presentation of the second set of questions.

In response to the user selecting a question of the second set of questions, at least one of the second module and the UI of an embodiment presents an answer to the selected question that includes the actionable insight.

The UI of an embodiment enables selection of a set of the reaction data to which the analyzing is applied, the selecting including selecting a portion of the media instance to which the set of the reaction data corresponds. The portion of an embodiment includes a point in time. The portion of an embodiment includes a period of time.

The first module of an embodiment generates aggregated reaction data by aggregating the reaction data from the plurality of viewers.

The aggregating of an embodiment comprises aggregating the reaction data according to at least one of maximums, minimums, averages, deviations, derivatives, amplitudes, and trends of at least one parameter of the reaction data.

The method of an embodiment comprises generating synchronized data by synchronizing the plurality of media events of the media instance with the reaction data.

The method of an embodiment comprises enabling remote interactive manipulation of the media instance via the UI.

The method of an embodiment comprises enabling remote interactive manipulation of the reaction data via the UI.

The method of an embodiment comprises enabling remote interactive manipulation of the plurality of renderings via the UI.

The method of an embodiment comprises enabling remote interactive manipulation of the actionable insights via the UI.

The plurality of renderings of an embodiment includes text, charts, graphs, histograms, images, and video.

The reaction data of an embodiment includes at least one of physiological responses, survey results, feedback generated by the viewers, metadata, and derived statistics.

The reaction data of an embodiment includes physiological responses.

The reaction data of an embodiment includes survey results.

The reaction data of an embodiment includes feedback generated by the viewers.

The reaction data of an embodiment includes metadata, wherein the metadata is event-based metadata.

The reaction data of an embodiment includes derived statistics, wherein the derived statistics are derived statistics for indicators of success and failure of the media instance.

The method of an embodiment comprises a plurality of sensor devices, wherein each viewer wears a sensor device of the plurality of sensor devices, wherein each sensor device receives the reaction data from a corresponding view and transmits the reaction data to at least one of the first module and the database.

The reaction data of an embodiment corresponds to electrical activity in brain tissue of the user.

The reaction data of an embodiment corresponds to electrical activity in muscle tissue of the user.

The reaction data of an embodiment corresponds to electrical activity in heart tissue of the user.

A first set of the plurality of viewers of an embodiment is at a first location and a second set of the plurality of viewers of an embodiment is at a second location different from the first location.

A first set of the plurality of viewers of an embodiment is viewing the media instance at a first time and a second set of the plurality of viewers is viewing the media instance at a second time different from the first time.

Embodiments described herein include a system comprising: a processor coupled to a database, the database receiving a media instance and reaction data from a plurality of viewers while the plurality of viewers are viewing the media instance; a first module coupled to the processor, the first module automatically analyzing the reaction data; and a second module coupled to the processor, the second module presenting the results by presenting actionable insights corresponding to a portion of the media instance via at least one of a plurality of renderings, wherein the actionable insights correspond to emotional reactions of the plurality of viewers.

Embodiments described herein include a system comprising: a processor coupled to a database, the database receiving a media instance and reaction data from a plurality of viewers viewing the media instance; a first module coupled to the processor, the first module analyzing the reaction data; and a second module coupled to the processor, the second module presenting results of the analyzing by presenting a set of questions corresponding to a portion of the media instance, the set of questions corresponding to at least one of a plurality of renderings, wherein answers to questions of the set of questions present actionable insights of the reaction data, the actionable insights corresponding to emotional reactions of the plurality of viewers.

Embodiments described herein may be implemented using a conventional general purpose or a specialized digital computer or microprocessor(s) programmed according to the teachings of the present disclosure, as will be apparent to those skilled in the computer art Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

An embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The embodiments described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of the systems described herein, and/or provided by some combination of algorithms. The methods described herein can be implemented in one or more of software algorithm(s), programs, firmware, hardware, components, circuitry, in any combination.

The components described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, HTTPs, FTP, SMTP, WAP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the embodiments to the specific embodiments disclosed in the specification and the claims, but should be construed to include all systems and methods under the claims. Accordingly, the embodiments are not limited by the disclosure, but instead the scope of the embodiments is to be determined entirely by the claims.

While certain aspects of the embodiments are presented below in certain claim forms, the inventors contemplate the various aspects of the embodiments in any number of claim forms. Accordingly, the inventors reserve the right to add additional claims after filing the application to pursue such additional claim forms for other aspects of the embodiments.

What is claimed is:

1. A system comprising:
a processor coupled to a database, the database including a media instance and reaction data, the media instance comprising a plurality of media events, the reaction data received from a plurality of viewers viewing the media instance;
a first module coupled to the processor, the first module generating aggregated reaction data by aggregating the reaction data from the plurality of viewers, the first module generating synchronized data by synchronizing the plurality of media events of the media instance with corresponding aggregated reaction data; and
a second module coupled to the processor, the second module comprising a plurality of renderings and a user interface (UI) that provide controlled access to the synchronized data from a remote device, wherein the controlled access includes interactive control of analysis of the reaction data and the corresponding events of the media instance.

2. The system of claim 1, wherein the controlled access is through the UI and includes remote interactive manipulation of the reaction data synchronized to corresponding events of the media instance.

3. The system of claim 2, wherein the manipulation includes at least one of dividing, dissecting, aggregating, parsing, organizing, and analyzing the reaction data.

4. The system of claim 1, wherein the controlled access includes access to at least one of the reaction data and aggregated reaction data.

5. The system of claim 1, wherein the controlled access includes interactive analysis of at least one of the media instance and the synchronized data.

6. The system of claim 5, wherein the controlled access includes interactive analysis of at least one of the reaction data, the aggregated reaction data, and parsed reaction data.

7. The system of claim 1, wherein the plurality of renderings includes text, charts, graphs, histograms, images, and video.

8. The system of claim 1, wherein the UI presents the synchronized data using at least one rendering of the plurality or renderings.

9. The system of claim 1, wherein the UI allows selection of a portion of the media instance for which at least one of the synchronized data, the reaction data, the aggregated reaction data, and parsed reaction data is viewed.

10. The system of claim 9, wherein the portion includes a point in time.

11. The system of claim 9, wherein the portion includes a period of time.

12. The system of claim 1, wherein the first module analyzes the reaction data.

13. The system of claim 12, wherein the UI provides remote access to results of the analysis.

14. The system of claim 13, wherein the UI presents the results using at least one rendering of the plurality of renderings, the results including actionable insights corresponding to a portion of the media instance.

15. The system of claim 14, wherein the actionable insights correspond to emotional reactions of the plurality of viewers.

16. The system of claim 12, wherein the analyzing comprises applying expert knowledge of physiological behavior to the reaction data.

17. The system of claim 12, comprising generating a first set of questions that represent the results.

18. The system of claim 17, wherein the analyzing includes analyzing the reaction data in the context of the first set of questions.

19. The system of claim 17, comprising selecting at least one rendering of the plurality of renderings.

20. The system of claim 19, comprising tagging the selected rendering with at least one question of the first set of questions.

21. The system of claim 19, wherein a user can modify presentation of the results via the UI by selecting at least one rendering of the plurality of renderings.

22. The system of claim 17, wherein the presenting includes presenting the results via presentation of the first set of questions on the UI.

23. The system of claim 22, comprising, in response to the user selecting a question of the first set of questions, presenting via the UI an answer to the selected question that includes the actionable insight.

24. The system of claim 1, wherein the reaction data includes at least one of physiological responses, survey results, feedback generated by the viewers, metadata, and derived statistics.

25. The system of claim 1, wherein the reaction data includes physiological responses.

26. The system of claim 1, wherein the reaction data includes survey results.

27. The system of claim 1, wherein the reaction data includes feedback generated by the viewers.

28. The system of claim 1, wherein the reaction data includes metadata.

29. The system of claim 28, wherein the metadata is event-based metadata.

30. The system of claim 1, wherein the reaction data includes derived statistics.

31. The system of claim 30, wherein the derived statistics are derived statistics for indicators of success and failure of the media instance.

32. The system of claim 1, comprising a plurality of sensor devices, wherein each viewer wears a sensor device of the plurality of sensor devices, wherein each sensor device receives the reaction data from a corresponding view and transmits the reaction data to at least one of the first module and the database.

33. The system of claim 1, wherein the aggregating comprises aggregating the reaction data according to at least one of maximums, minimums, averages, deviations, derivatives, amplitudes, and trends of at least one parameter of the reaction data.

34. The system of claim 1, comprising a third module coupled to the second module, the third module receiving comments from the plurality of viewers in response to the viewing.

35. The system of claim 34, wherein the comments are textual comments.

36. The system of claim 34, wherein the synchronized data includes the comments.

37. The system of claim 1, comprising a third module coupled to the second module, the third module presenting survey questions to the plurality of viewers via the UI, the survey questions relating to the media instance.

38. The system of claim 37, wherein the third module receives answers to the survey questions from the plurality of viewers via the UI.

39. The system of claim 38, wherein the answers to the survey questions are textual comments.

40. The system of claim 38, wherein the synchronized data includes the answers to the survey questions.

41. The system of claim 1, wherein the plurality of viewers are at a location.

42. The system of claim 1, wherein the plurality of viewers are at a plurality of locations.

43. The system of claim 1, wherein a first set of the plurality of viewers are at a first location and a second set of the plurality of viewers are at a second location different from the first location.

44. The system of claim 1, wherein a first set of the plurality of viewers are viewing the media instance at a first time and a second set of the plurality of viewers are viewing the media instance at a second time different from the first time.

45. The system of claim 1, wherein the reaction data corresponds to electrical activity in brain tissue of the user.

46. The system of claim 1, wherein the reaction data corresponds to electrical activity in muscle tissue of the user.

47. The system of claim 1, wherein the reaction data corresponds to electrical activity in heart tissue of the user.

* * * * *